United States Patent [19]

Veres et al.

[11] Patent Number: 4,654,783

[45] Date of Patent: Mar. 31, 1987

[54] UNIQUE PROCESS FOR LOADING A MICROCODE CONTROL STORE IN A DATA PROCESSING SYSTEM

[75] Inventors: James E. Veres, Framingham; James B. Stein, Westboro; Robert W. Beauchamp, Milford; Harold R. Kimmens, Hudson; David W. Baird, Marlborough; Michael J. Roman, Westborough, all of Mass.; David G. Therrien, Nashua, N.H.; John J. Doyle, Franklin, Mass.

[73] Assignee: Data General Corporation, Westboro, Mass.

[21] Appl. No.: 402,052

[22] Filed: Jul. 26, 1982

[51] Int. Cl.⁴ .............................................. G06F 9/00
[52] U.S. Cl. ...................................... 364/200; 364/300
[58] Field of Search ... 364/200 MS File, 900 MS File

[56] References Cited

U.S. PATENT DOCUMENTS

| | | | |
|---|---|---|---|
| 4,191,996 | 3/1980 | Chesley | 364/200 |
| 4,276,594 | 6/1981 | Morley | 364/200 |
| 4,334,307 | 6/1982 | Bourgeous et al. | 364/200 |
| 4,402,953 | 11/1984 | Burke | 364/200 |
| 4,414,669 | 11/1983 | Heckelman et al. | 364/200 |

Primary Examiner—Gareth D. Shaw
Assistant Examiner—John G. Mills
Attorney, Agent, or Firm—Robert F. O'Connell

[57] ABSTRACT

A technique for starting up a data processing system in which a "basic" or "kernel" instruction set is stored in an auxiliary store and transferred to the processor's control store in start-up. The kernel instruction set in used to execute an initialization program which identifies an I/O device in which a microcode local program and a desired microcode file are stored. No microcode load program is transferred to the processor's main memory, using the kernel instructions and the desired microcode file is then transferred in selected blocks from the I/O device to the main memory and there to the microcode control store. The microinstructions of the desired microcode file then can be used to load appropriate operating system software so that the overall processor is then ready for use in whatever applications are desirable.

13 Claims, 24 Drawing Figures

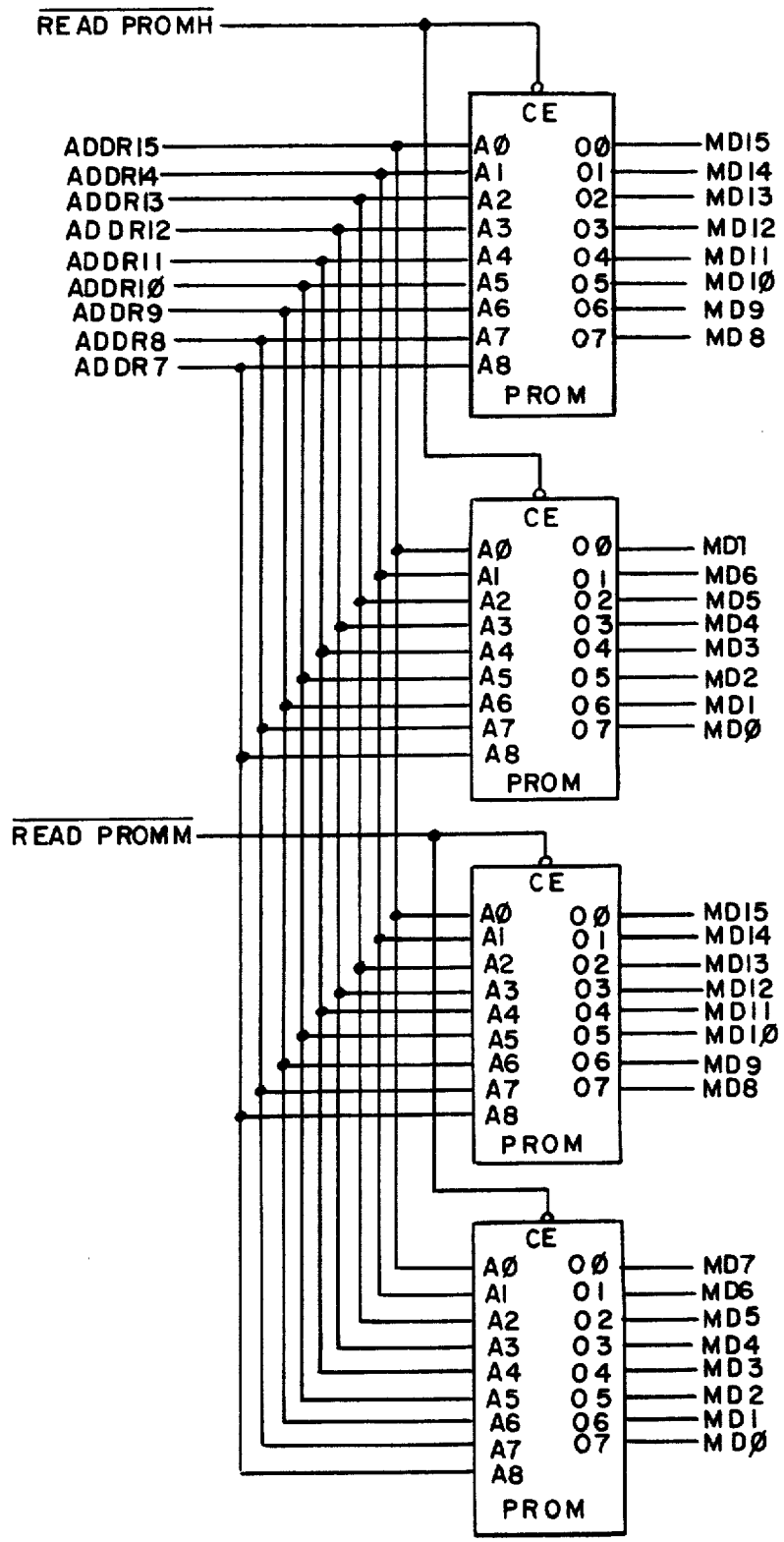
FIG.5 CONT.    SCP PROM ARRAY

SYSTEM CLOCK GENERATION

UNIQUE PROCESS FOR LOADING A MICROCODE CONTROL STORE IN A DATA PROCESSING SYSTEM

This invention relates generally to microcode control store loading techniques and, more particularly, to a process for loading a microcode control store which permits the loading of microcode from a plurality of sources thereof and which requires no special controller or specified location for such purpose.

BACKGROUND OF THE INVENTION

In data processing systems which utilize a control store for storing microcode (i.e., microinstructions) for use in implementing programs in response to the decoding of macroinstructions, for example, the microcode which is loaded therein is usually fixed in nature and only a single set of microcode instructions can be normally so loaded. Such conventional systems, accordingly, tend to be less flexible since they are limited to the loading of only a single set of microinstructions. Moreover, a special controller is normally required in order to access the microcode from an appropriate I/O device (such as a floppy disk, for example) on which the microcode is stored and such controller is normally designed to access only the I/O device which contains the fixed set of microcode instructions.

It is desirable, therefore, in order to provide more flexibility to such a microcode system to be able to access more than one set of microinstructions from more than one I/O device and to do so without the need for one or more special controllers for such purpose associated with each said I/O device.

BRIEF SUMMARY OF THE INVENTION

In accordance with the invention the system utilizes a basic instruction set (often referred to as the "kernel instructions") which can be used to operate the processor and its own normally available internal I/O controller already part of the system for permitting access to a plurality of I/O devices so as to make available to the microcode control store of the system more than one set of microcode instructions. Such "kernel" microinstructions may be initially stored in a suitable fixed or programmable read-only-memory (ROM or PROM) and automatically placed in the system's microcode control store at start-up. The "kernel" microinstructions can have associated therewith certain diagnostic microcode instructions which can be used to perform an initial testing of selected basic system components (e.g., a microsequencer unit which controls the sequencing of microinstructions, an internal instruction processor unit for decoding macroinstructions to provide the starting address of a sequence of microinstructions in the microcode control store, a main, or subsidary, memory unit, or units, an arithmetic logic unit, etc.).

The "kernel" microinstructions can then be used to execute a special initialization program which resets the I/O interface units and provides a "start" pulse and a device code for identifying a particular I/O device in which the desired microcode is stored. Such initialization program accesses a more complex "load" program (a "boot" program) on the previously identified I/O device and transfers such program into the main memory of the system.

The processor then is able to execute the boot program which searches for the desired microcode file in the identified I/O device (identified by the aforesaid device code) and loads the selected microcode file into the microcode control store of the processor system. Following such loading of the microcode, the processor, now under control of the newly loaded microinstruction set can then load the appropriate operating system software so that the overall system is then ready for use.

DESCRIPTION OF THE INVENTION

The invention can be described in more detail with the help of the accompanying drawings wherein:

FIGS. 2 and 2A, depict a more detailed logic diagram showing the micro-Nova control processor unit and support logic therefor used in the system control processor 11 of FIG. 1;

FIG. 1 shows in broad block diagram form key components of a data processing system which, for example, may be of the type now sold, for example, by Data General Corporation under the designation Eclipse ® MV/8000 computer system, as described, for example, in the following document:

Figure 1:
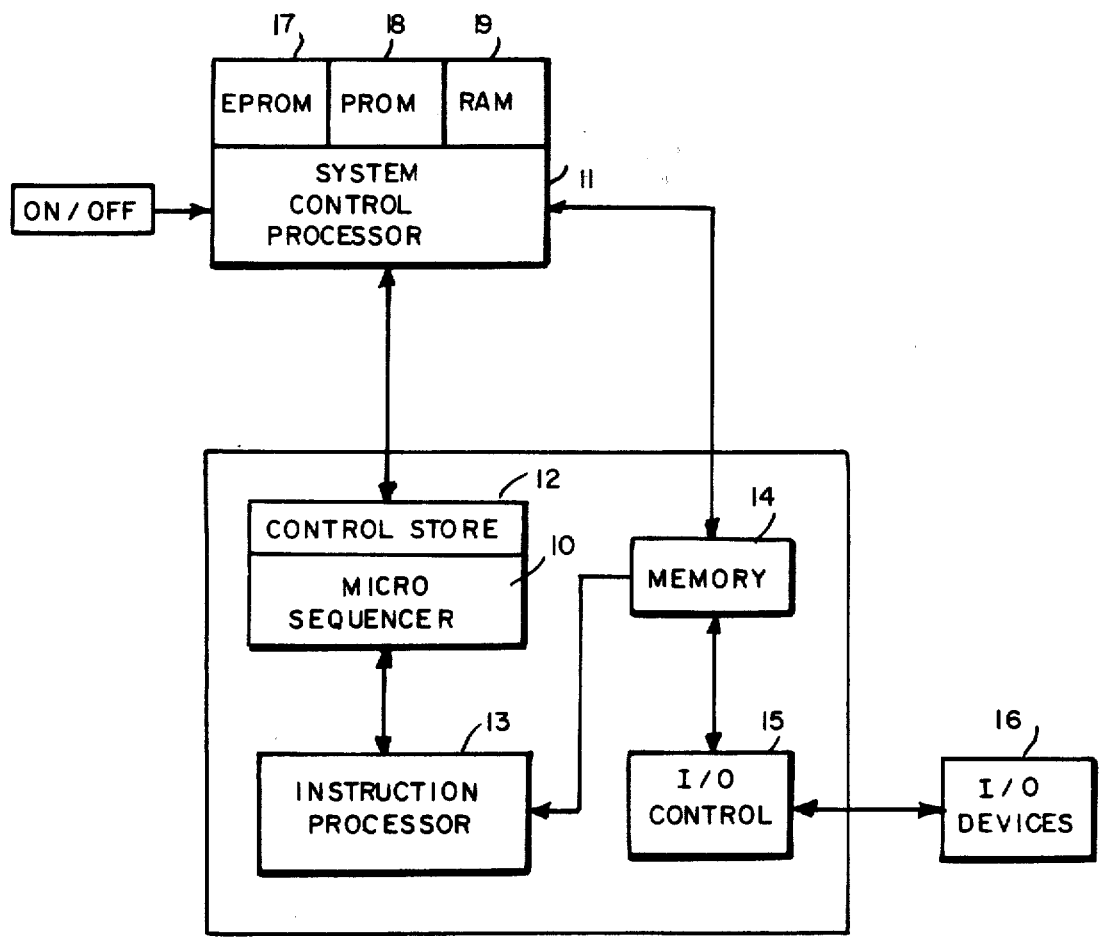
FIG. 1 depicts a block diagram of pertinent portions of a data processing system in which the invention is used.

"The Eclipse ® MV/8000 Principles of Operation"
No. 014-000648, Data General Corporation 1980, (Rev. 01, June 1981)

Such system is also described, for example, in U.S. patent application No. 143,561, filed April 25, 1980 by E. Rasala et al.

As can be seen in such above documents the system includes a microsequencer unit 10 which is used to control the sequential selection of microcode instructions from a microcode control store 12. Such system is normally under the control of an instruction processor unit 13 which decodes macroinstructions to provide the starting address in the control store of a sequence of one or more microinstructions required to execute the macroinstruction. The system as shown has an appropriate main memory system 14 and an I/O controller interface unit 15 which controls the transfer of address and data between the processor and one or more I/O devices 16.

In a particular embodiment of the system in accordance with the invention, such system has, in addition, a system control processor 11 which is used during the start-up and microcode control store loading operations and which essentially involves specially designed hardwired logic for accessing PROM units 17 and 18 and a random access memory (RAM) unit 19 and for transferring data between main memory 14 and the control store of microsequencer unit 10.

The system control processor (often hereinafter referred to as the SCP) is initiated upon actuation of the power ON/OFF switch 21, as diagrammatically shown in FIG. 1. The EPROM unit 17, for example, has a "kernel" microcode instruction set fixedly stored therein. In the particular Data General Eclipse ® MV/8000 system in which the invention can be found useful, for example, such "kernel" microcode instruction set is identified as the Data General Nova ® Instruction Set originally designed for use in Data General Corporation's Model Nova ® 800 computer system, as described in the following document:

Programmer's Reference Manual
Nova Line Computers
Data General Corporation
No. 014-000631

Such "kernel" instruction set is also included as part of the overall instruction set for the Eclipse ® MV/8000 system as described in the previously identified Eclipse ® document. The PROM unit 18 is utilized to store both an initialization program (hereinafter referred to as the "BOOT" program) and a "LOAD CONTROL STORE" (LCS) program, as well as appropriate diagnostic programs for initially testing the system components, as mentioned above. The RAM unit 19 is available for use in the starting procedures and for the control store loading process in accordance with the invention.

When system power is turned on, the SCP is automatically programmed to transfer the kernel (NOVA 800) instructions present in the EPROM 17, into the microcode control store 12 over bus 20. At the same time the LCS program and the power up diagnostic program are transferred from the EPROM 17 to the RAM 19. Once the "kernel" instruction set is made available in the microcode control store, the SCP is used to control the execution of the power up diagnostic program for testing the various components of the overall system as mentioned above. A more complete power-up diagnostic program is included herein in microfiche form as an appendix hereto, such microfiche being incorporated herein by reference, under the provisions of 37 CFR 1.96 as an exemplary program for use in performing such initial diagnostic procedures. Such microfiche is identified under the title "POWER-UP DIAGNOSTIC PROGRAM" and the listing begins with the legend "Start of Host Resident Power-Up Test".

The kernal instruction set also includes two additional instructions, the first of which can be identified as an "NCPID" instruction which effectively identifies the processor as an MV/8000 and, accordingly, prevents any attempt to load microcode instructions other than those which can be used in a Data General Eclipse ® MV/8000 computer system. The second additional instruction is identified as the "Load Control Store" (LCS) instruction, which instruction is discussed in more detail below.

Once the overall "kernel" instruction set (the basic Nova ® 800 instruction set, the NCPID instruction and the LCS instruction) is loaded into the control store 12, and the diagnostic instructions have been both loaded and executed, the system control processor then transfers the special initialization program (the "BOOT" Program) from PROM 18 to the main memory system 14 over bus 22 and the system's main processor (shown as instruction processor 13) begins execution thereof.

The BOOT program comprises essentially only three macroinstruction steps as follows (the locations represent exemplary locations in the main memory:

| Location | Instruction | |
|----------|-------------|---|
| 375: | IORST | |
| 376: | NIOS | <DEV> |
| 377: | JMP | 377 |

As can be seen, the initial step of the BOOT program is merely a reset step which resets the I/O interface unit to place it in condition for a transfer of information to or from an I/O device and the main processor. The next step effectively supplies a start pulse and an I/O device code which identifies an I/O device which has stored therein, for example, a system start up program (the "MBOOT" program) which is to be loaded into main memory 14 for execution, as well as the desired microcode instructions which are to be eventually loaded into the microcode control store 12 by the aforesaid load control store (LCS) program under control of the MBOOT program.

While the main processor, using the BOOT program, is locating and transferring the MBOOT program from the particular identified I/O device to the main memory 14, the "JMP" step of the BOOT program prevents the processor from performing any other function until the MBOOT program has been so loaded. Once the MBOOT program is loaded into memory it overrides the JMP step of the BOOT program and the execution of "MBOOT" begins.

The function of the MBOOT program is to search the storage file structure of the identified I/O device in order to locate the desired microcode instruction file which is to be loaded into the microcode control store 12. Thus the MBOOT program is arranged to permit the user to identify a particular microcode file which it desires to be so loaded. Accordingly, as part of the MBOOT program, the user must identify the request file by name, e.g., "MICROCODE".

Once the appropriate microcode file is identified by the MBOOT program, the MBOOT program locates the file in the selected I/O device and transfers up to 16K words of the selected microcode file from the device into the main memory system 14.

Once the MBOOT program has loaded the first portion of the selected microcode file into main memory, the "kernel" instruction set then is utilized by the MBOOT program to execute the LCS instruction. This in turn transfers control to the LCS program, this program being executed by the system control processor (SCP) 11. Under such conditions the normally used main instruction processor (which at this stage still operates, in effect, as a Nova 800 processor) is halted and the SCP takes over control of system operation by executing the LCS program, which in the embodiment discussed is stored in RAM 19.

The microcode instructions exist in main memory in a specifically designated format which can be identified as the MC format. Such format is included herein in microfiche form as a further appendix hereto, such microfiche being incorporated by reference, under the provisions of 37 CFR 1.96. Such microfiche is identified under the title "MC FORMAT". The microcode instructions can then be transferred from the main memory to the after conversion into a form acceptable to the control store. Thus, for example, the first portion of the microcode contains a version of the "kernel" microcode instruction which has originally been loaded into main memory in MC format. Such first portion must then be loaded into the control store in a version which is identical to the original version in operating characteristics but which is modified in both location and content for integrated operation with the entire Eclipse ® MV/8000 instruction set. The remaining portions of the selected microcode file contain the remainder of the MV/8000 instruction set to form the overall instruction set.

In accordance with both the LCS program, executed by the SCP, and the MC format interpretation of the microcode in main memory, the SCP loads the first portion of the selected microcode instructions from the main memory 14 into the microcode control store 12. It then verifies that such first portion was correctly loaded, using well known verification techniques. The SCP then terminates the LCS program, returning control to the MV/8000 main processor which, still functioning as a Nova ® 800 processor and still executing the MBOOT program, determines if there is additional microcode to be read from the I/O device into main memory. When additional microcode is to be loaded into the control store, the MBOOT program will read the next portion of the selected microcode file into main memory 14 and issue a subsequent LCS instruction. The subsequent execution of the LCS instruction will cause the same steps of the LCS program which were used by the SCP to load the first portion of microcode into the control store to be performed on this next portion. It should be noted that at this stage the "kernel" instruction set, which is being utilized both to read in further microcode from the I/O device and to execute the LCS instruction, has been obtained from the I/O device itself.

When all portions of the selected microcode instruction set have been successively transferred, the selected microcode instruction set has been completely loaded into the control store 12 and the system is then capable of operation as an Eclipse ® MV/8000 processor.

Figure 2:
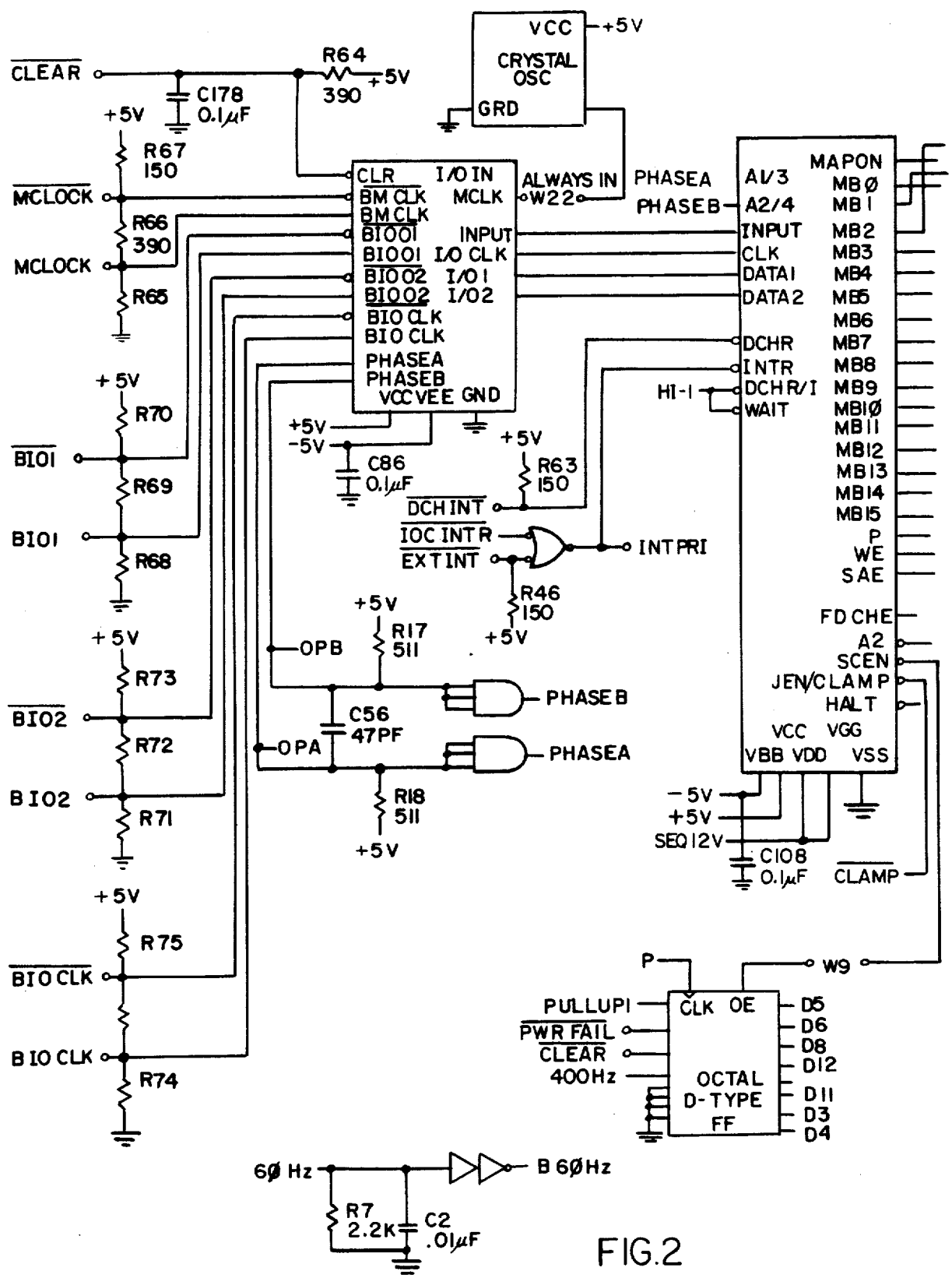
Figure 2:
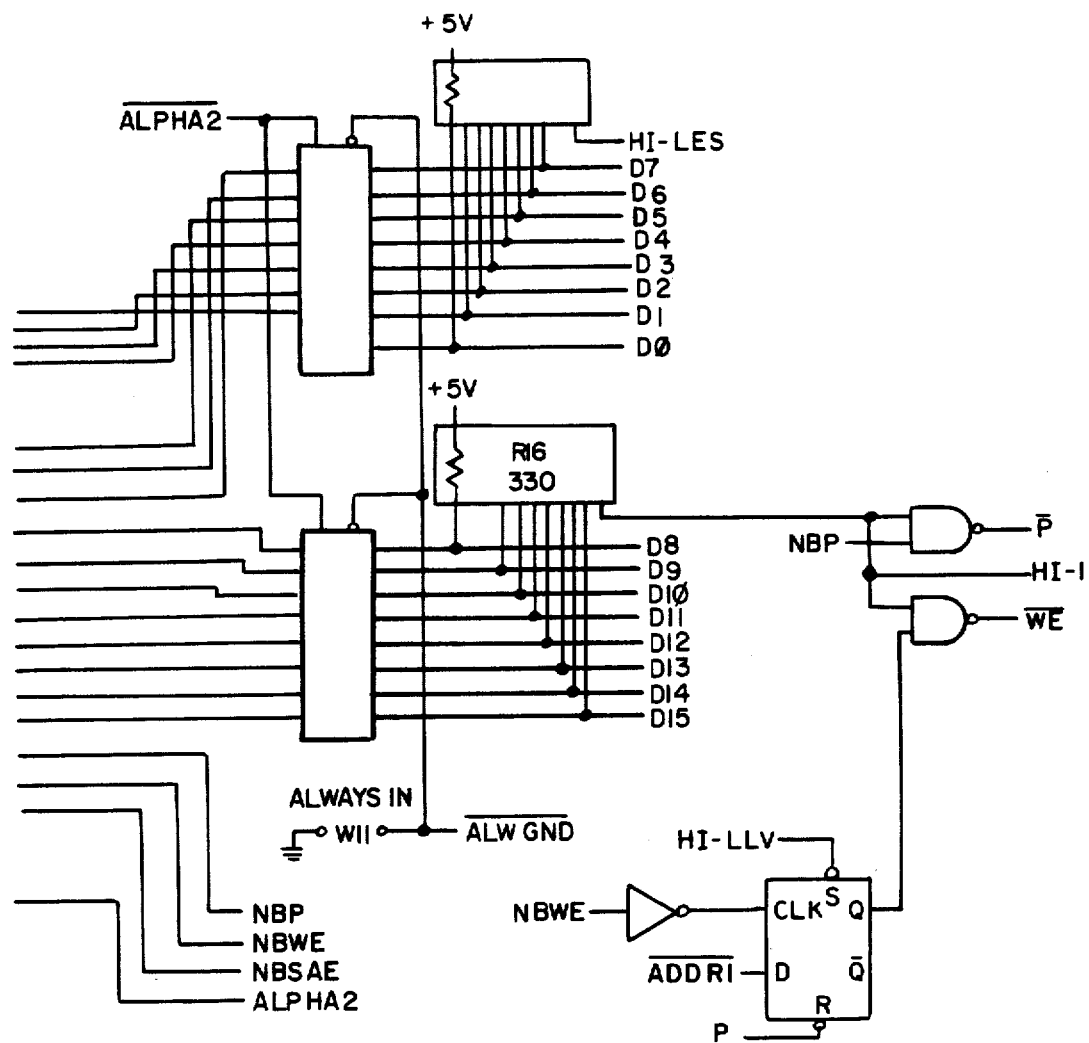
Figure 2:
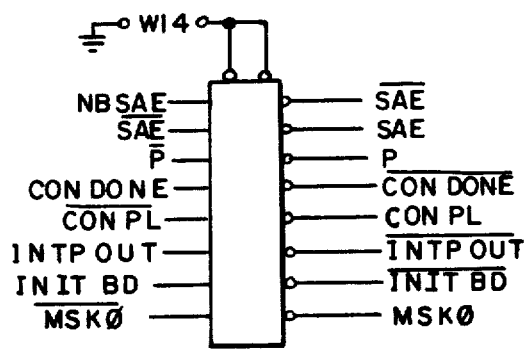
Figure 3:
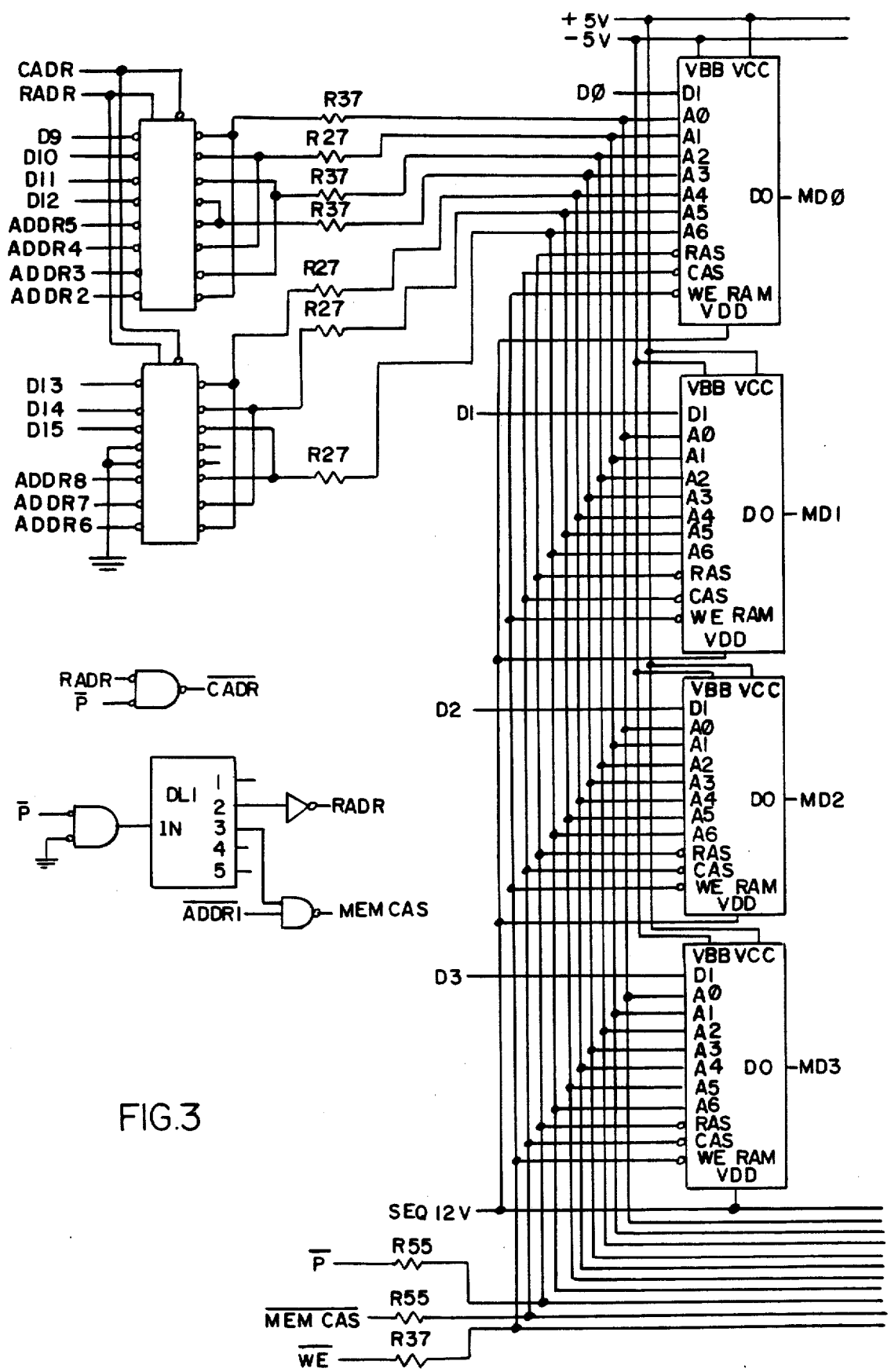
FIGS. 3, 3A and 3B depict a more detailed logic diagram showing the RAM unit 19 of FIG. 1.
Figure 3A:
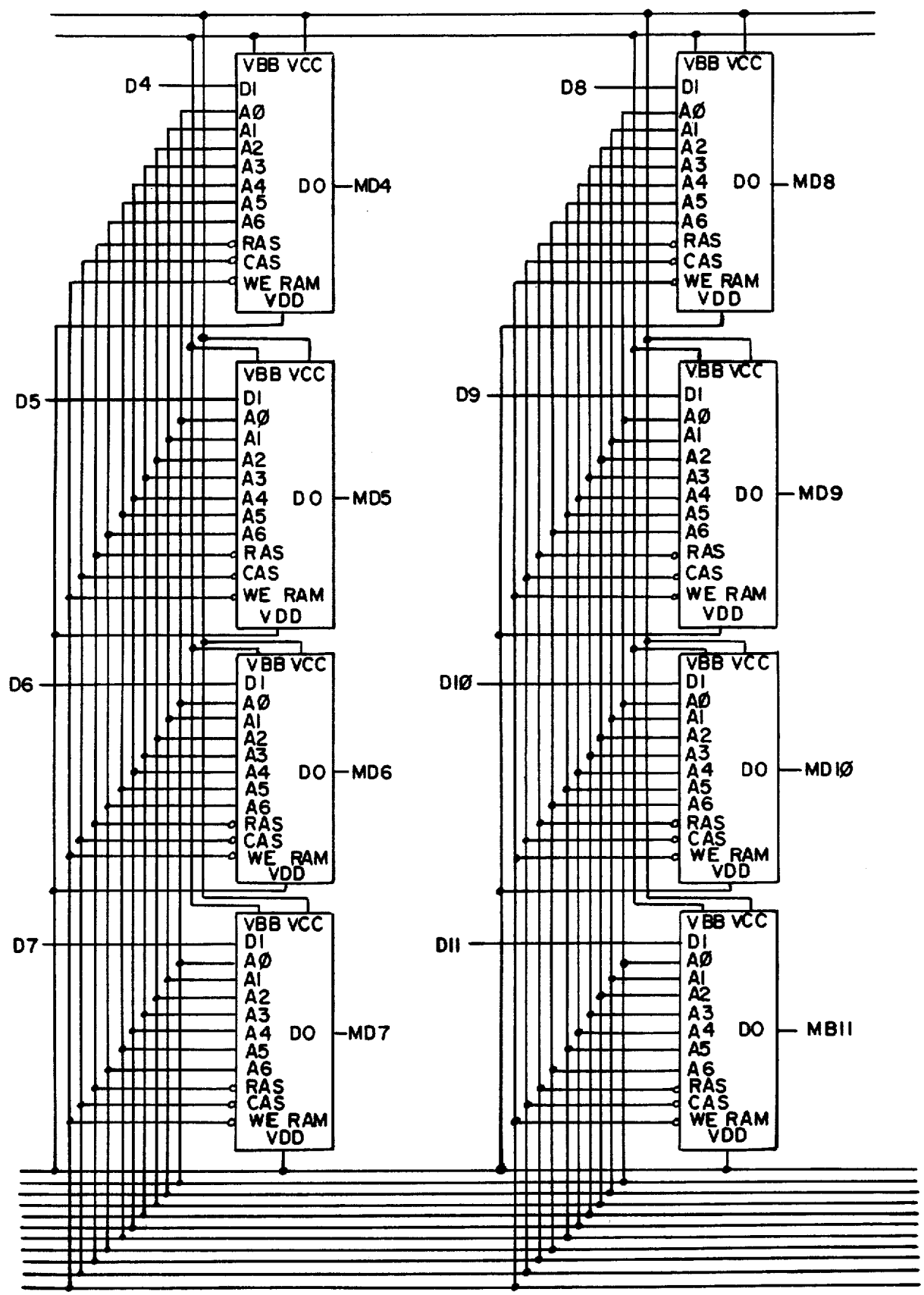
Figure 3B:
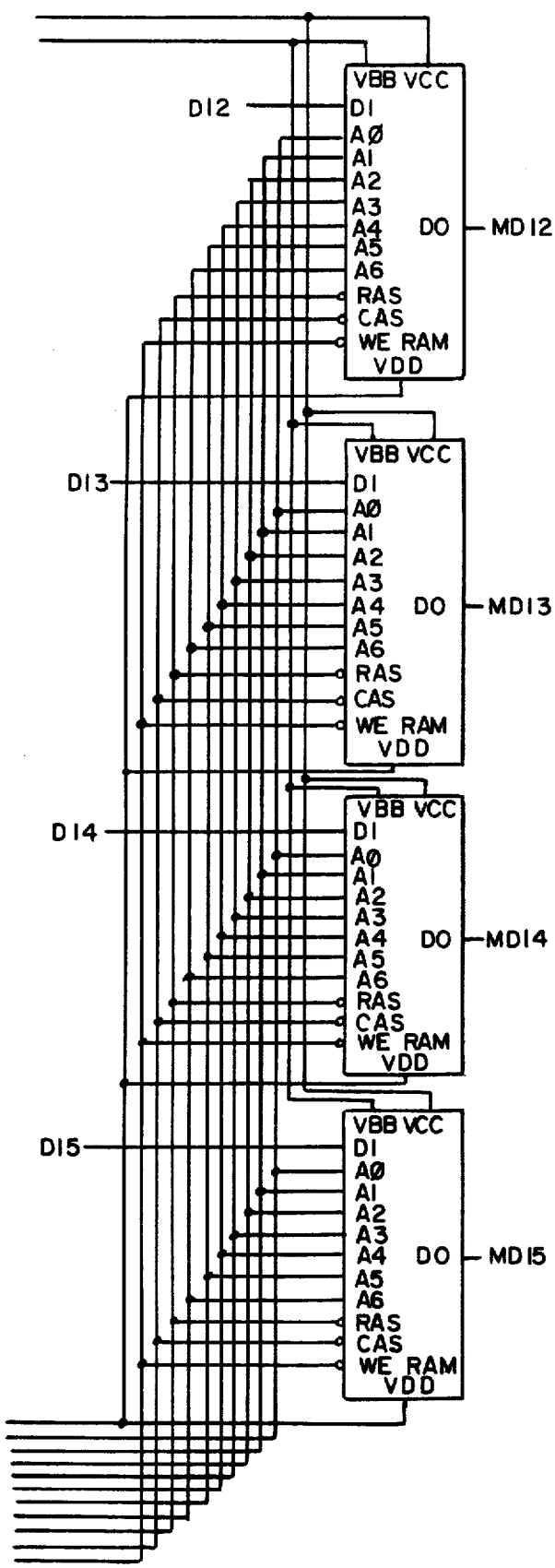
Figure 4:
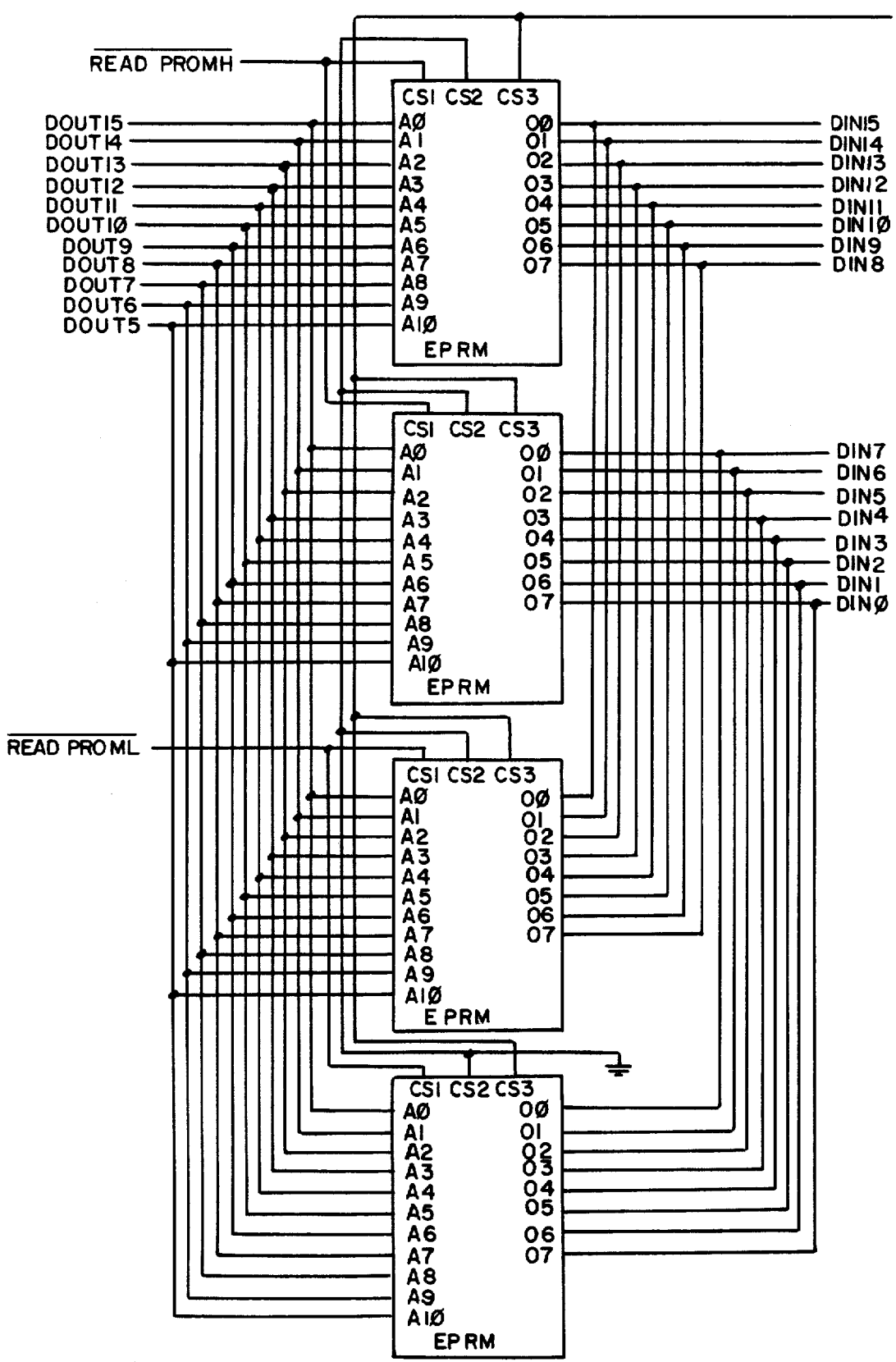
FIG. 4 depicts a more detailed logic diagram showing the EPROM unit 17 of FIG. 1.
Figure 4:
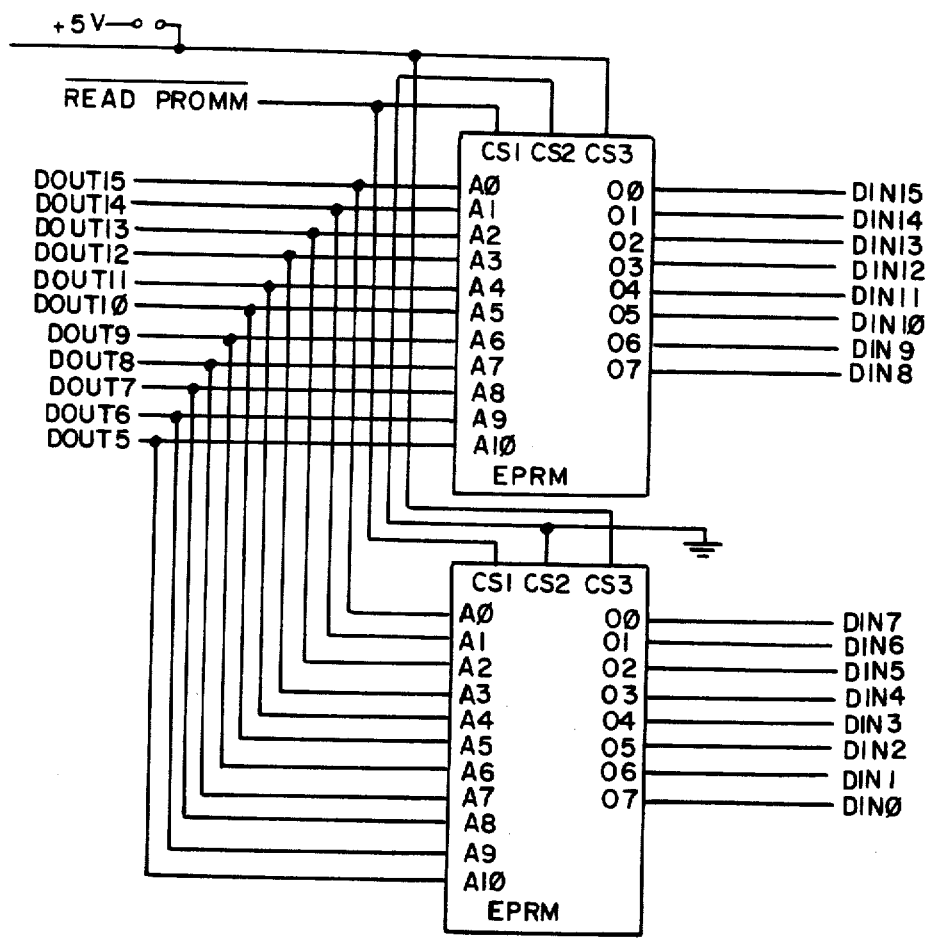
Figure 5:
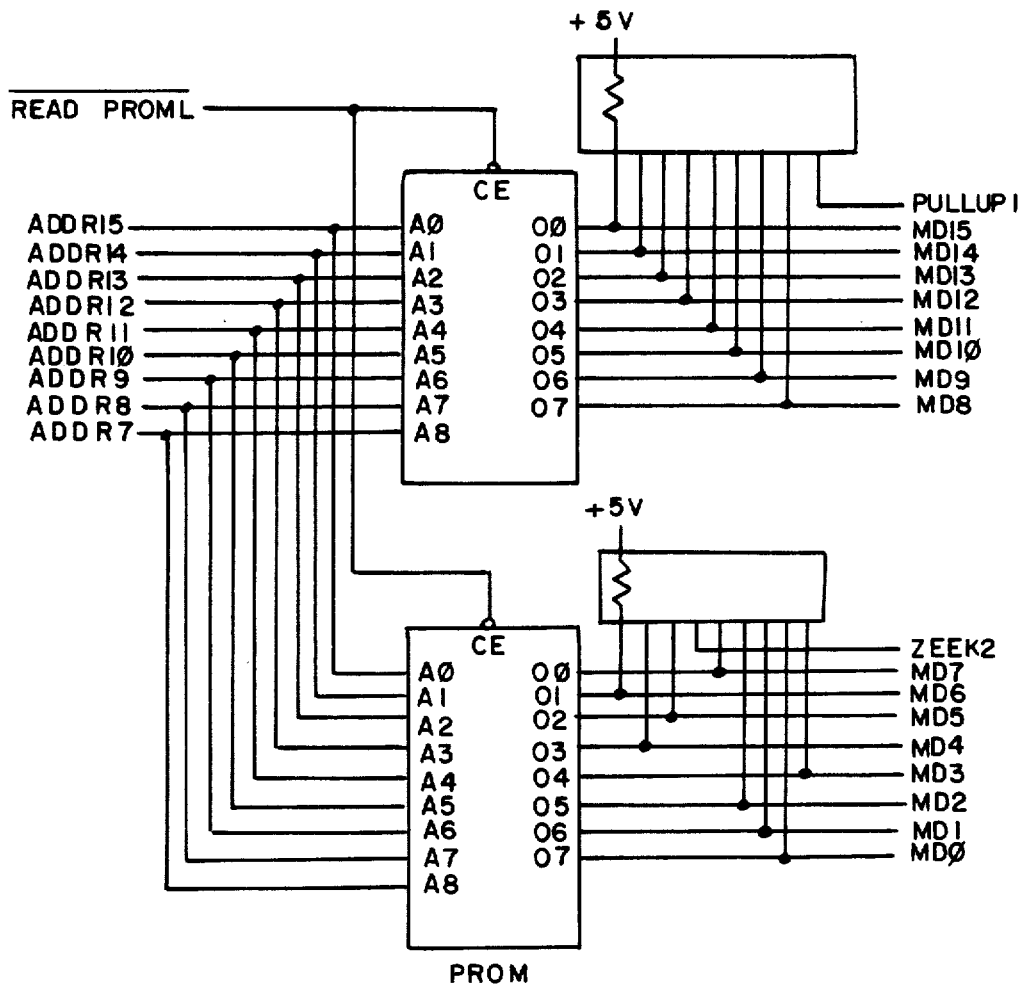
FIG. 5 depicts a more detailed logic diagram of the PROM unit 18 of FIG. 1.
Figure 6:
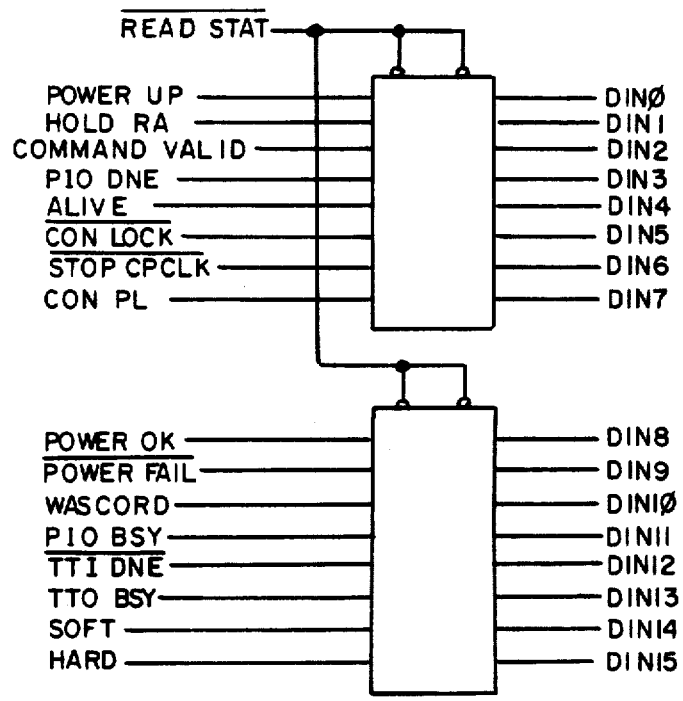
FIGS. 6, 6A, 6B, 6C and 6D depict a more detailed logic diagram showing internal control logic and internal bus interconnections used in the system control processor 11 of FIG. 1.
Figure 6A:
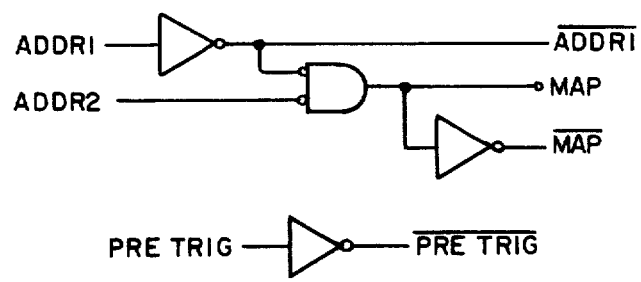
Figure 6:
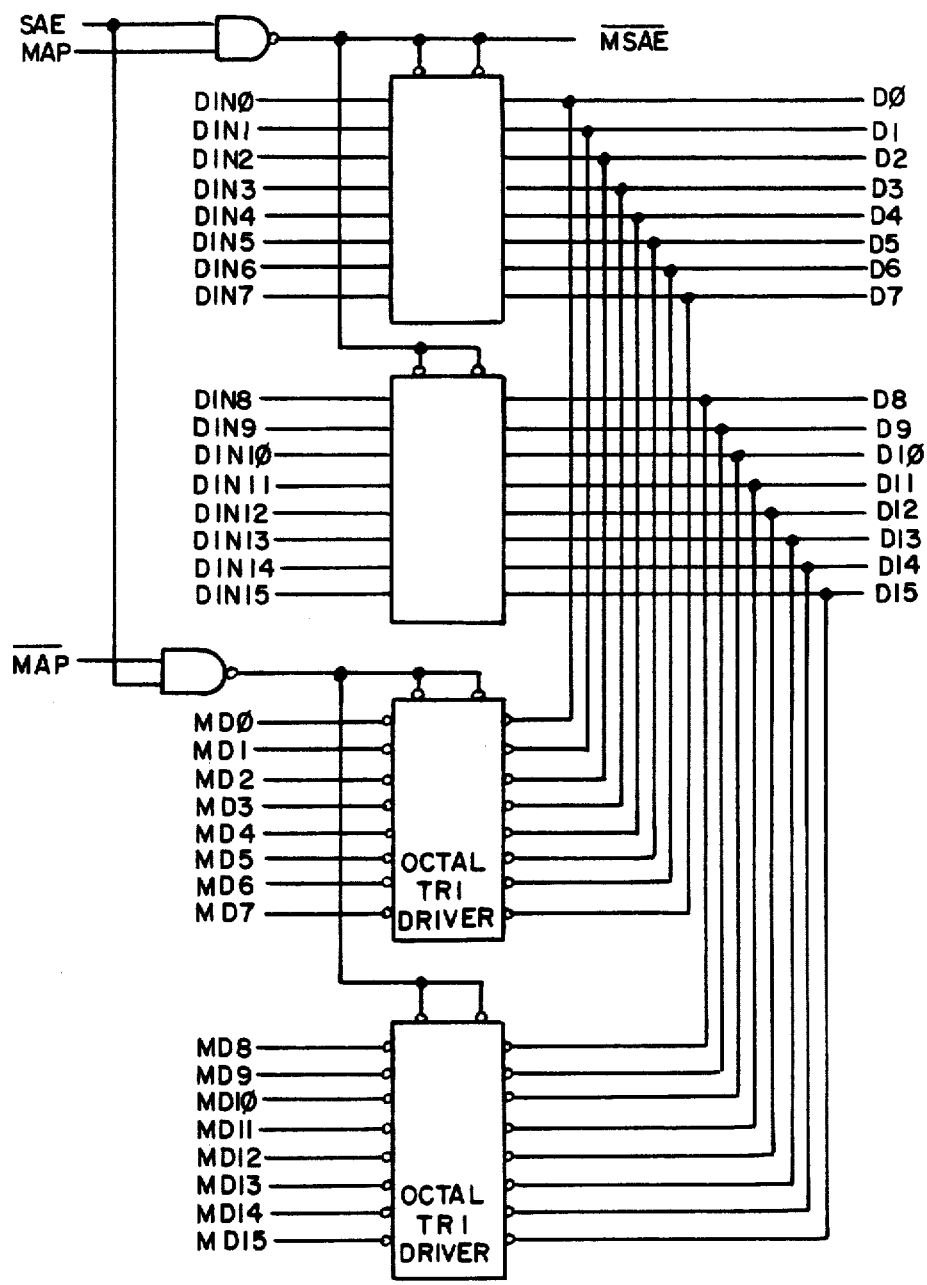
Figure 6A:
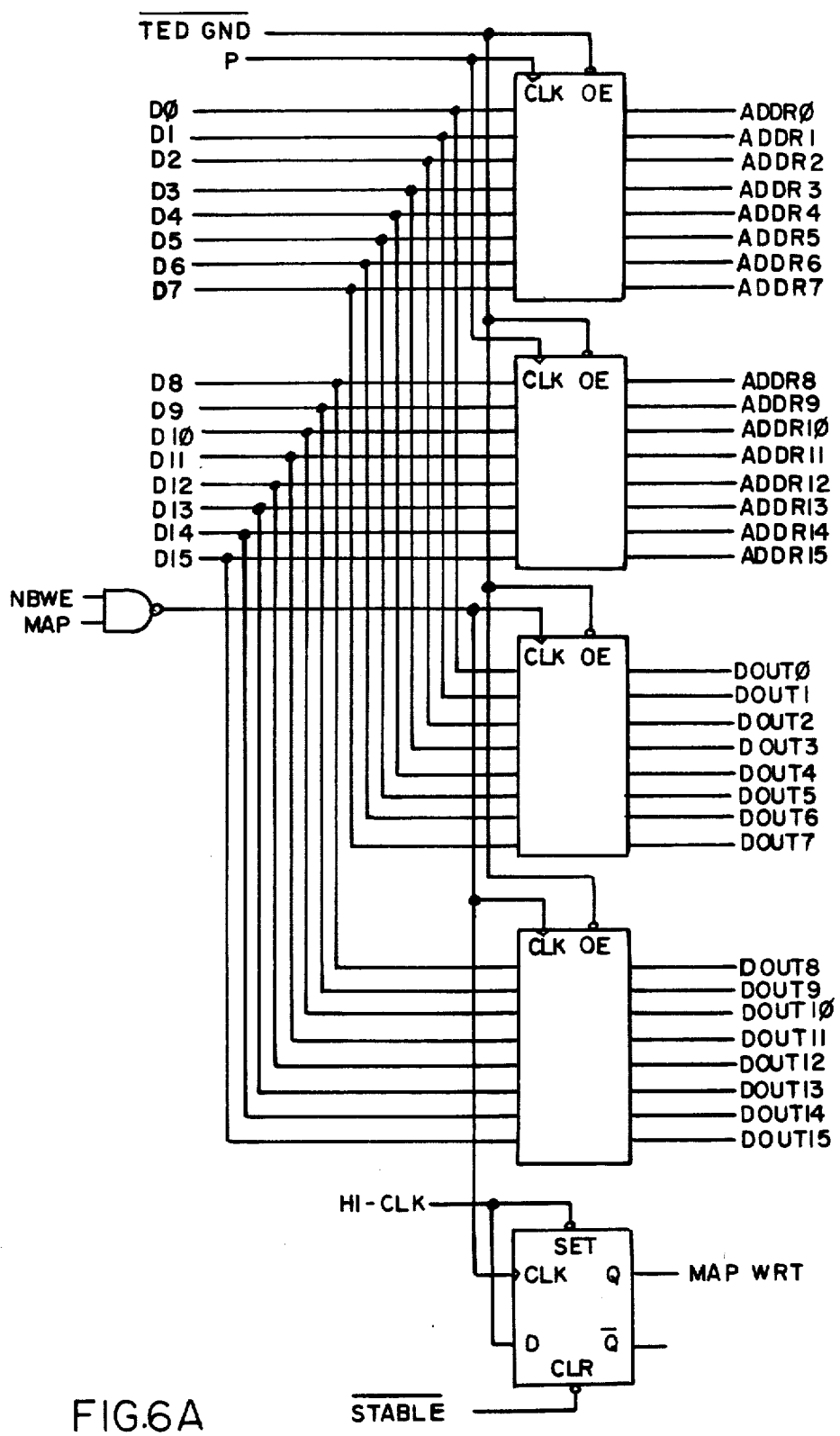
Figure 6B:
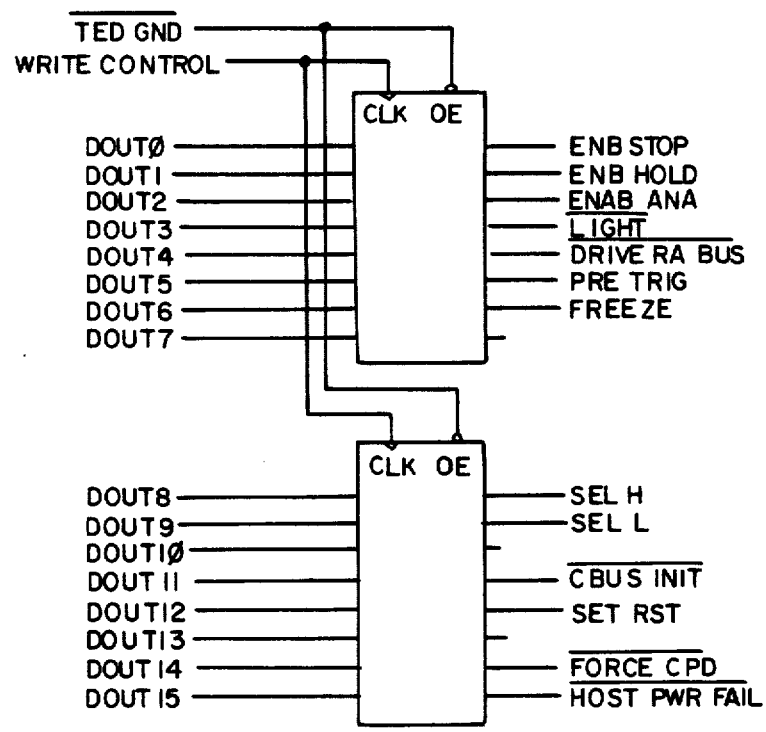
Figure 6B:
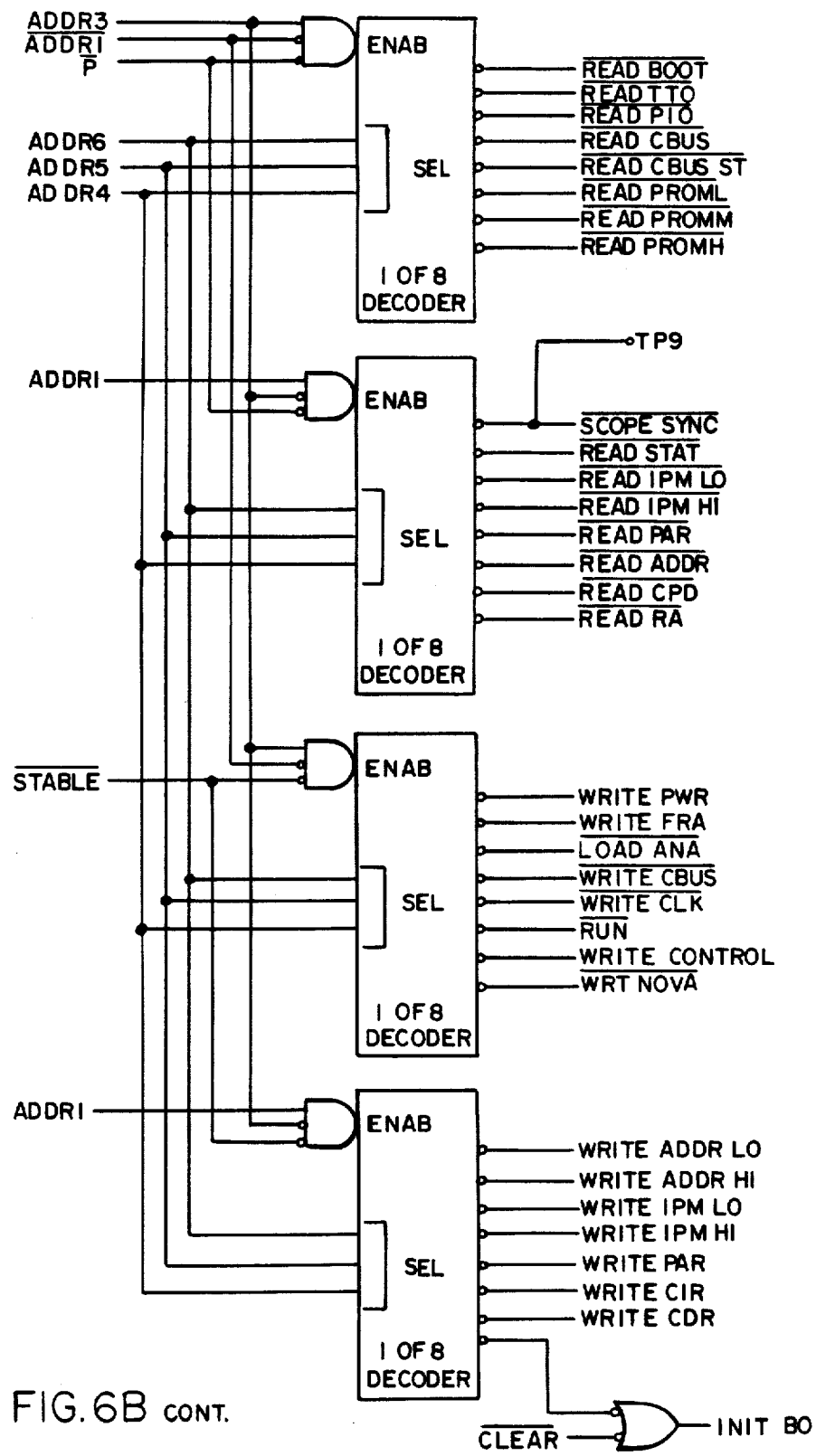
Figure 6C:
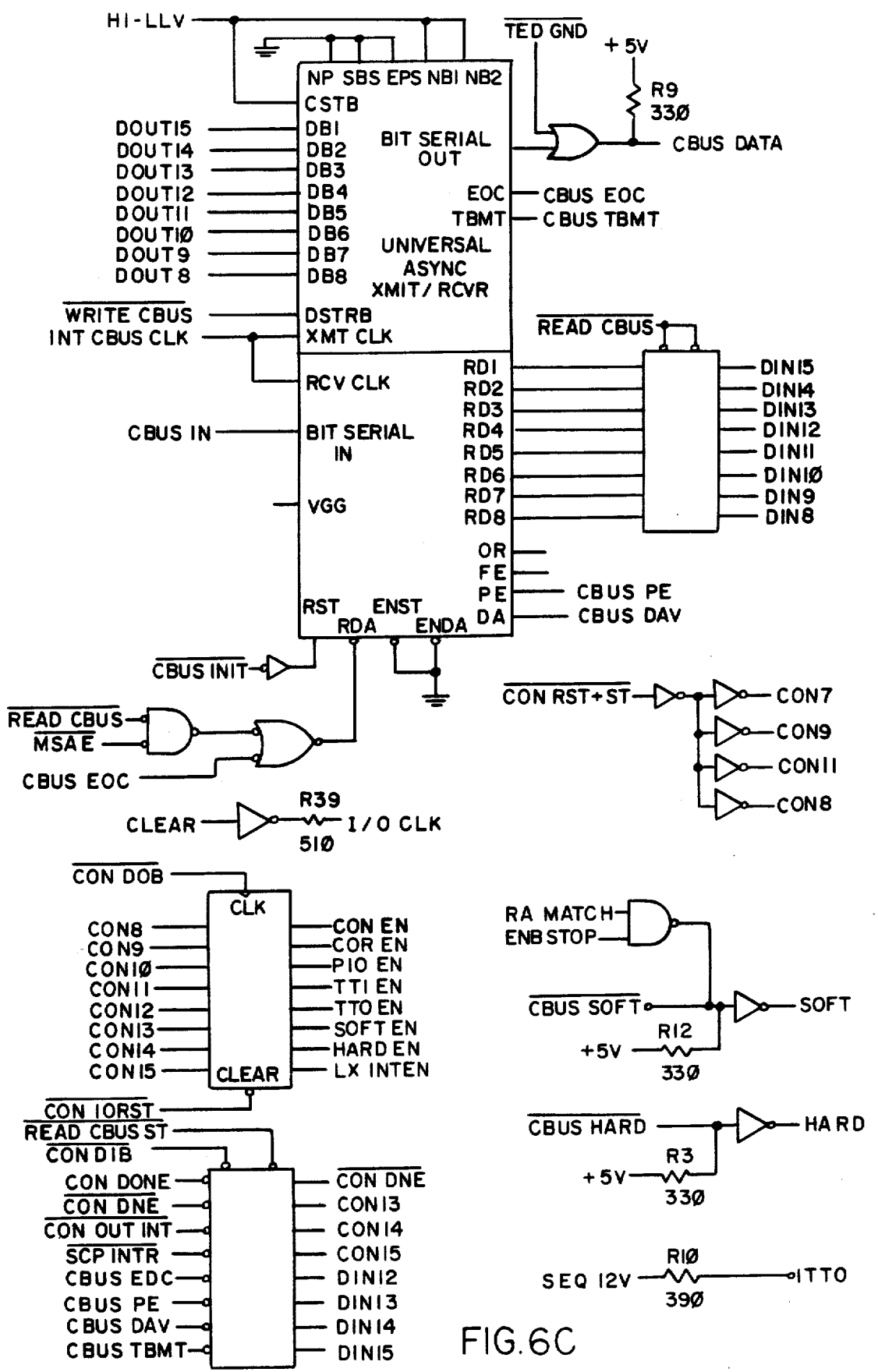
Figure 6D:
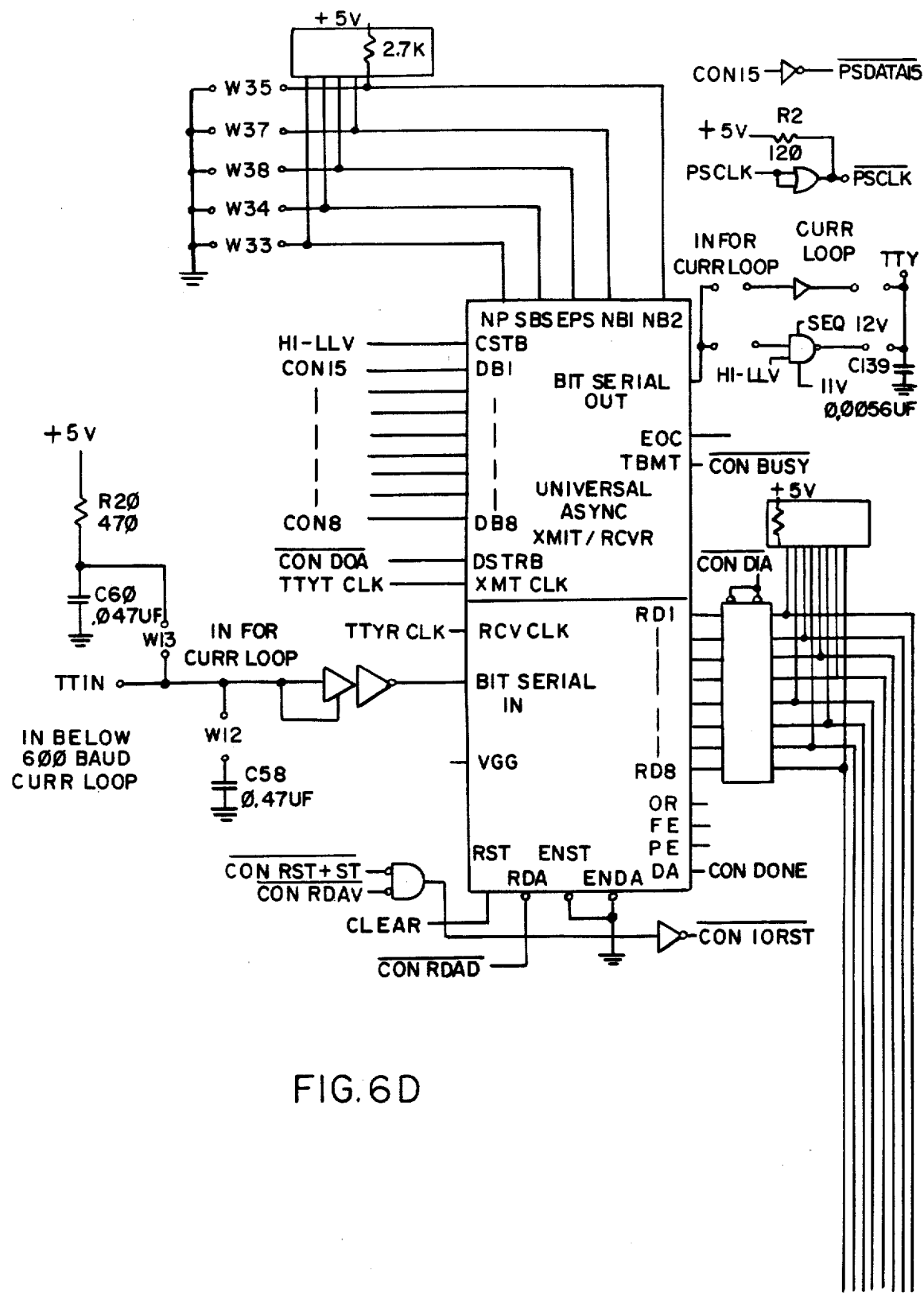
Figure 6D:
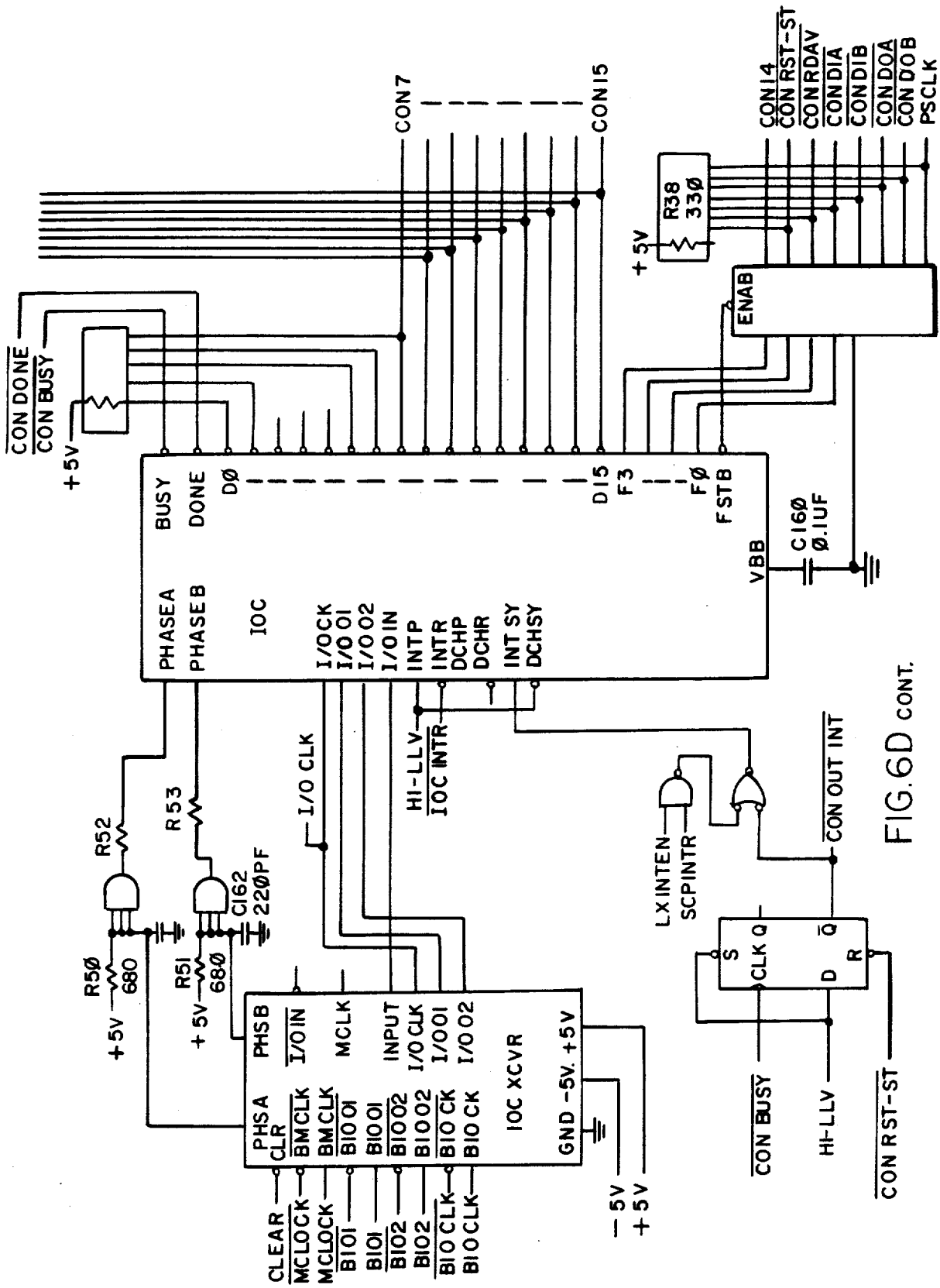
Figure 7:
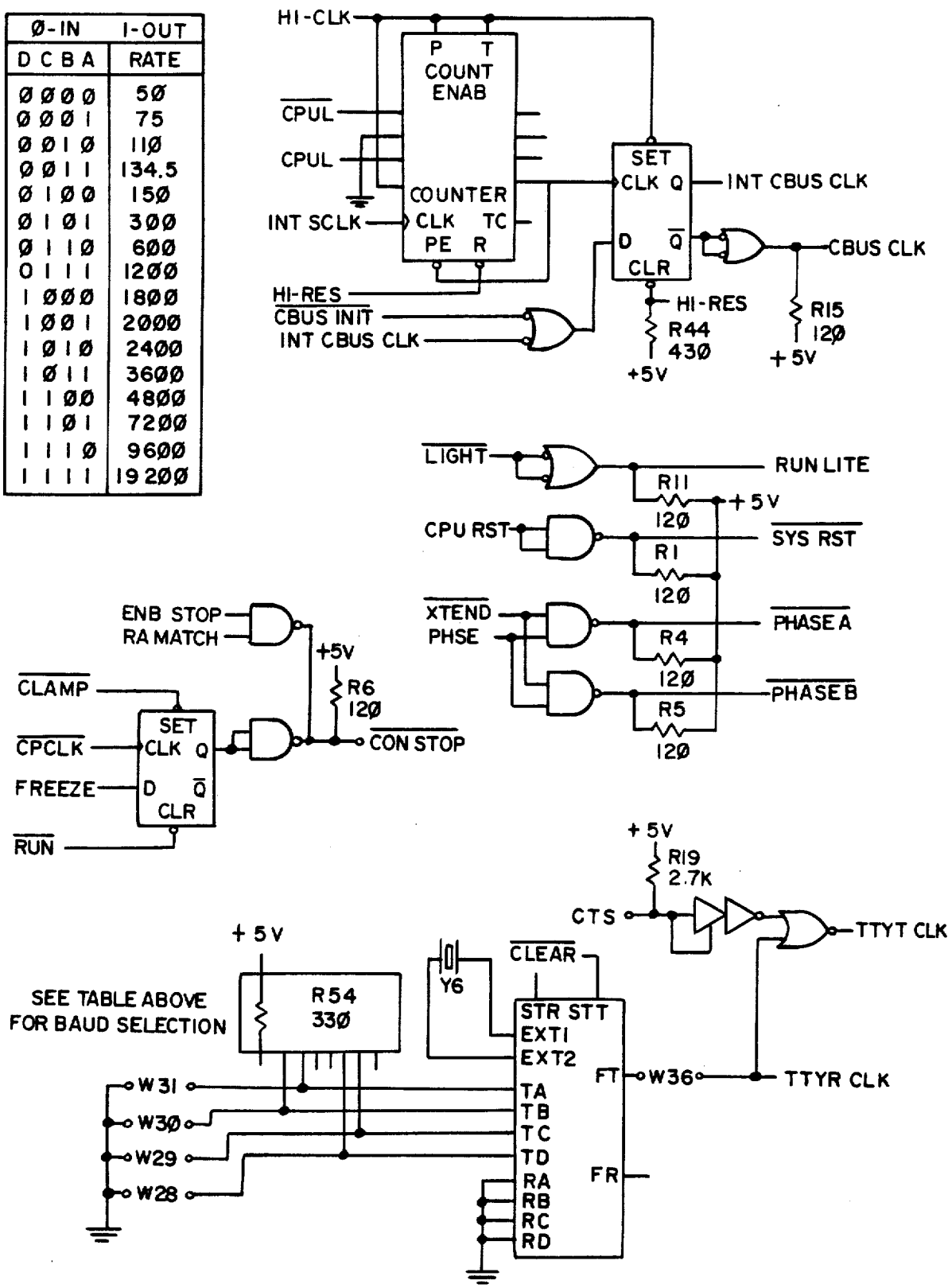
FIGS. 7, 7A and 7B depict a more detailed logic diagram of timing and clock generation logic used in the system control processor 11 of FIG. 1.
Figure 7A:
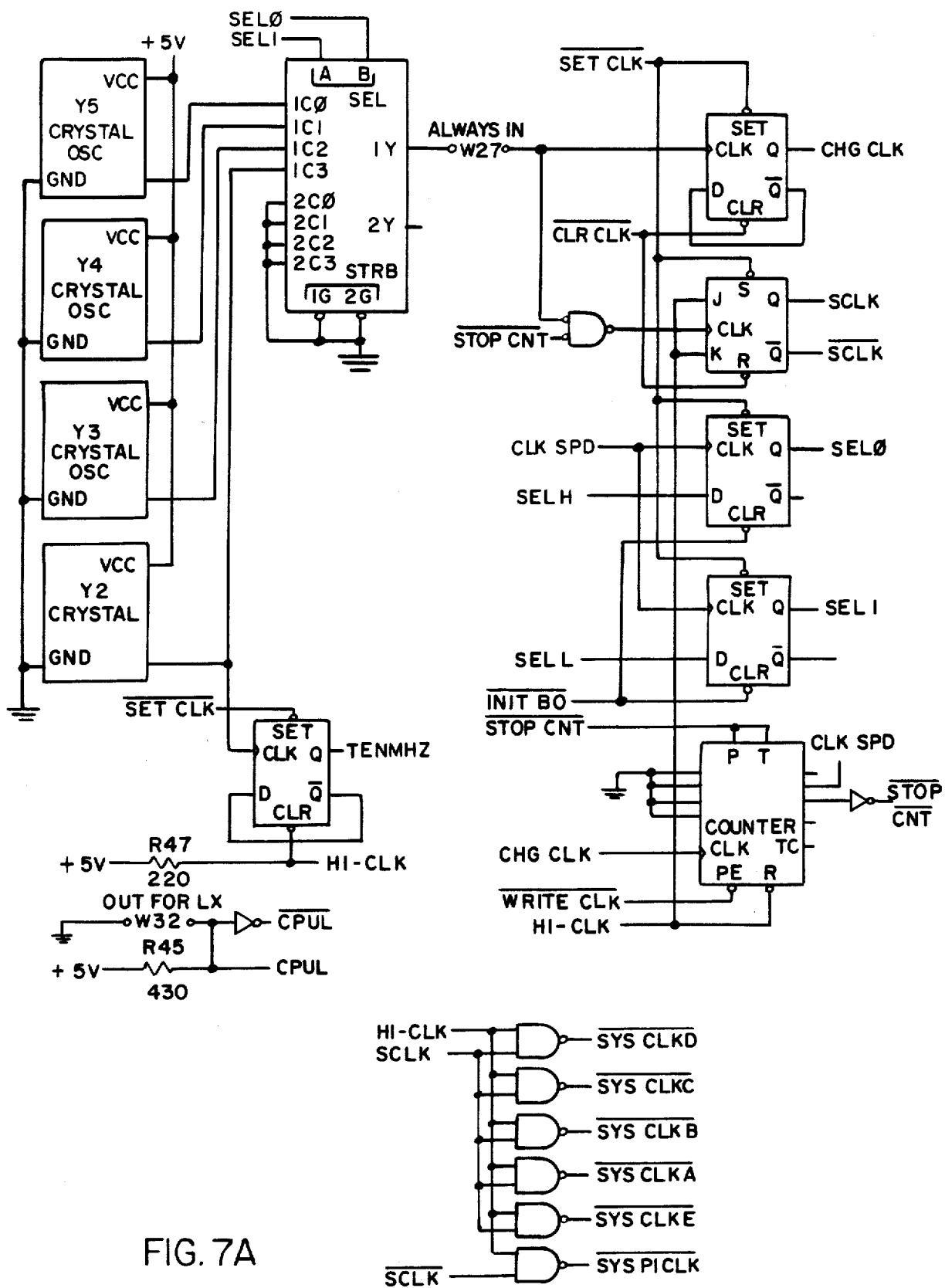
Figure 7B:
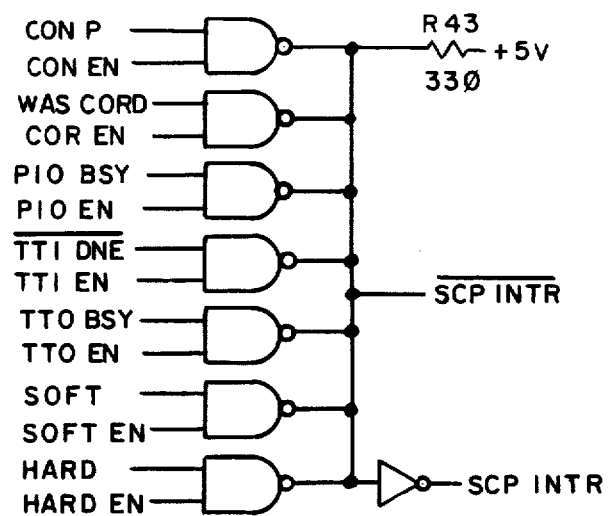
Figure 7B:
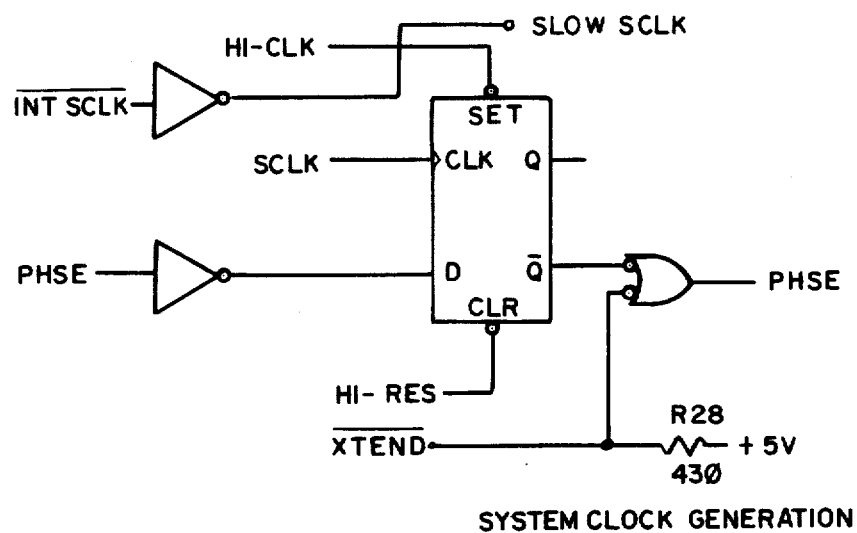
Figure 8:
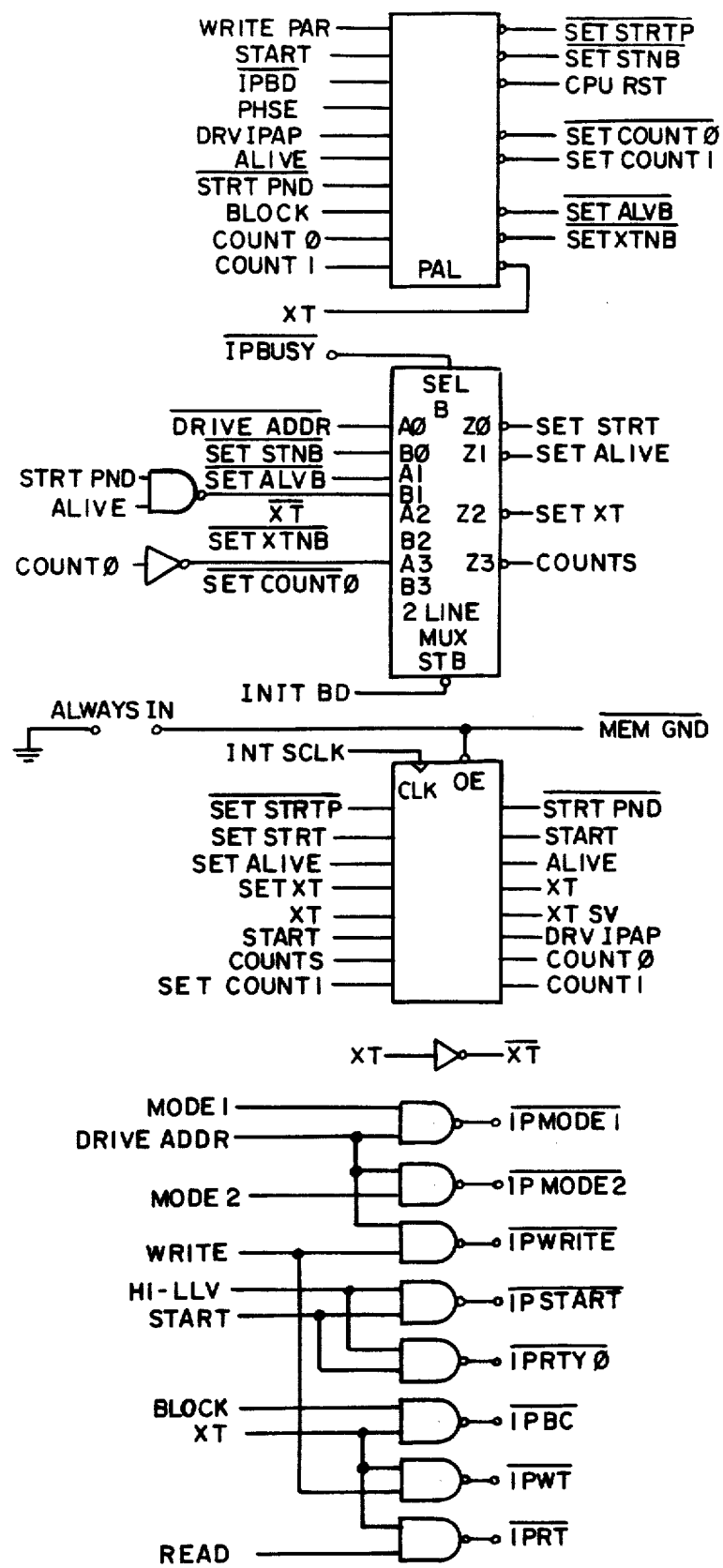
FIGS. 8, 8A, 8B and 8C depict a more detailed logic diagram of interface logic used in the system control processor of FIG. 1 to interface the main memory 14 via bus 21.
Figure 8A:
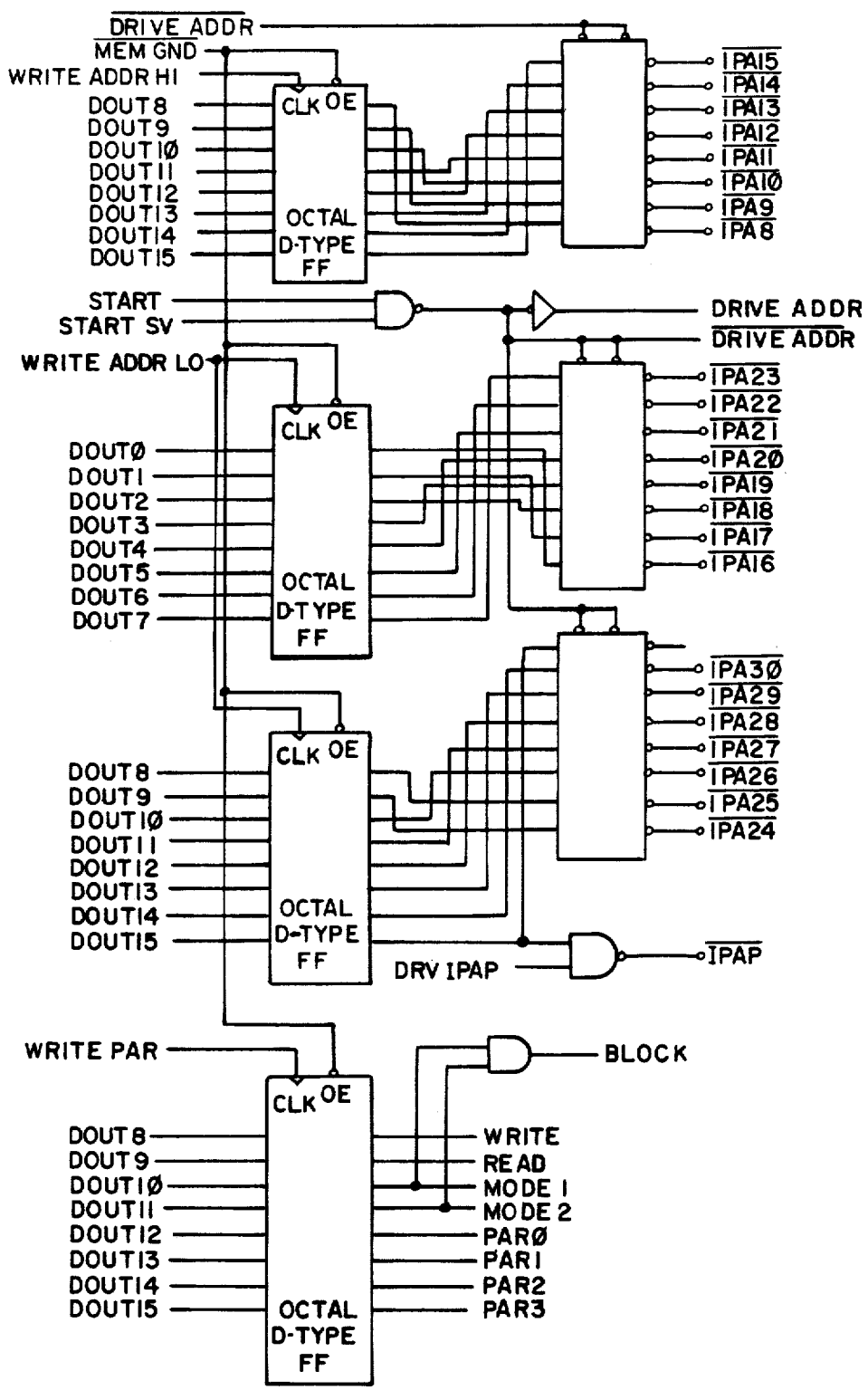
Figure 8B:
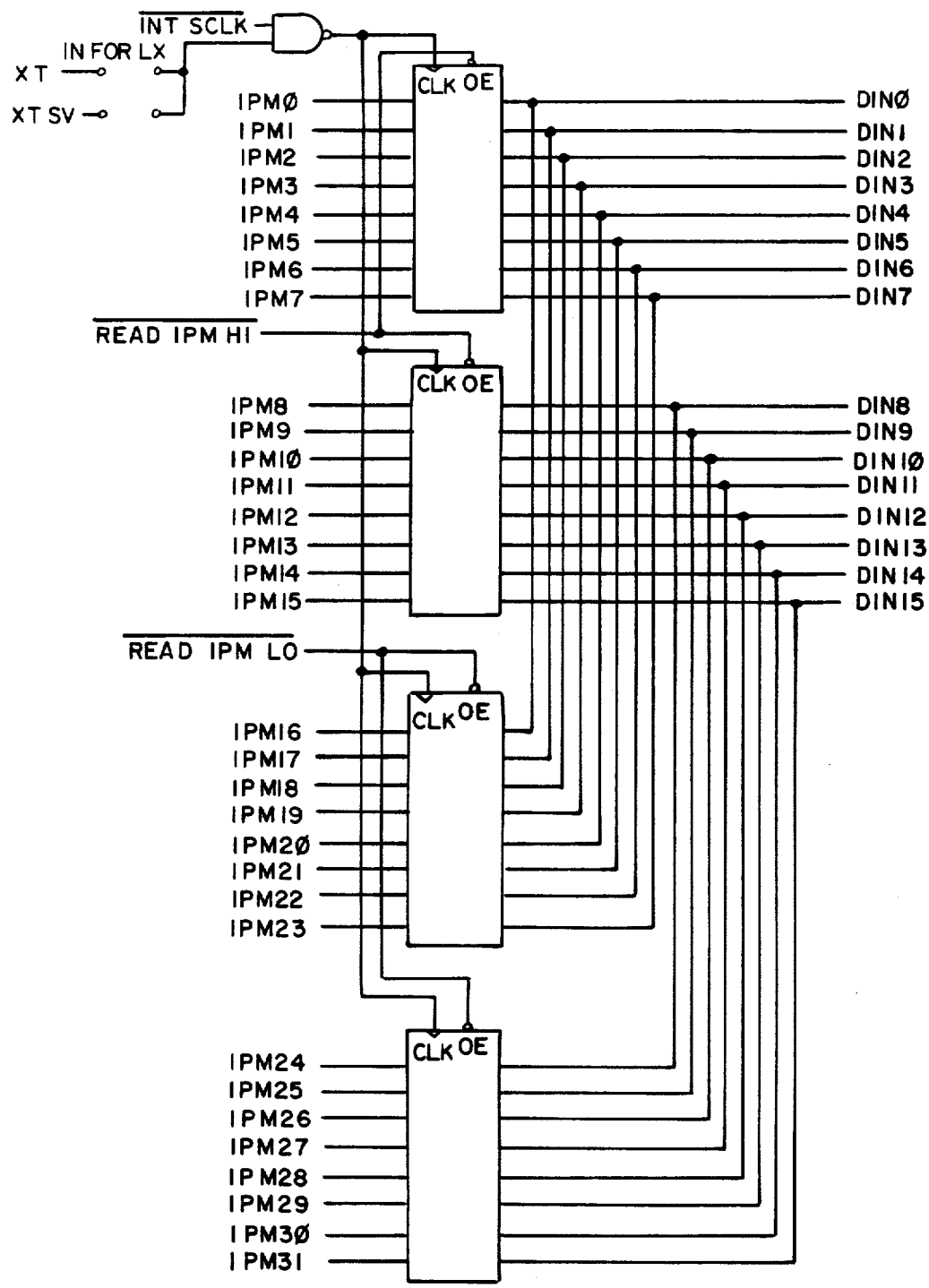
Figure 8B:
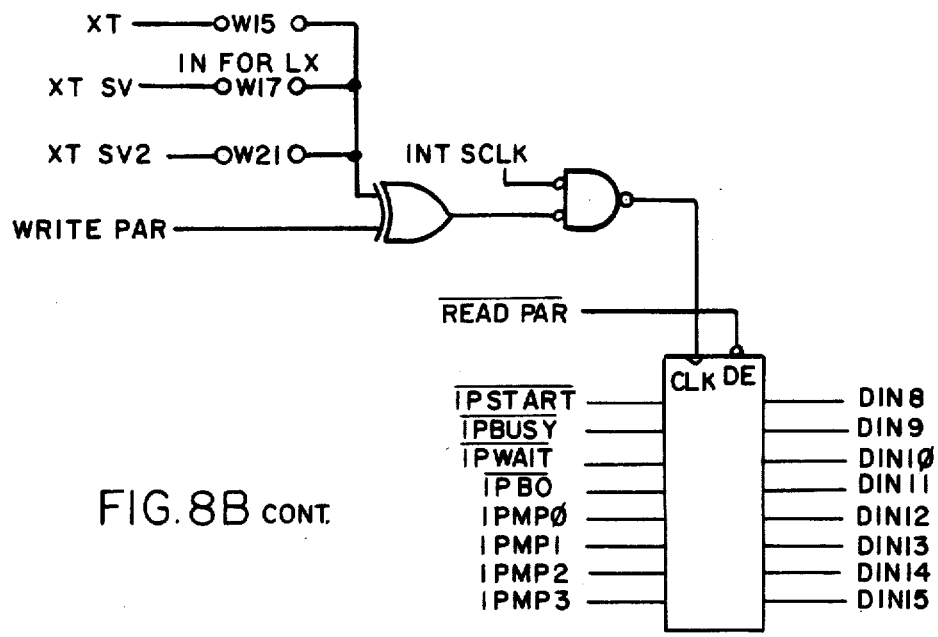
Figure 8C:
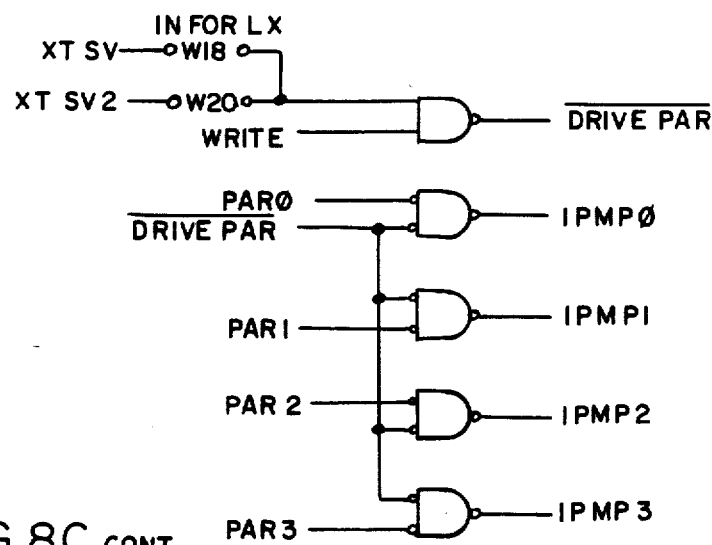
Figure 8C:
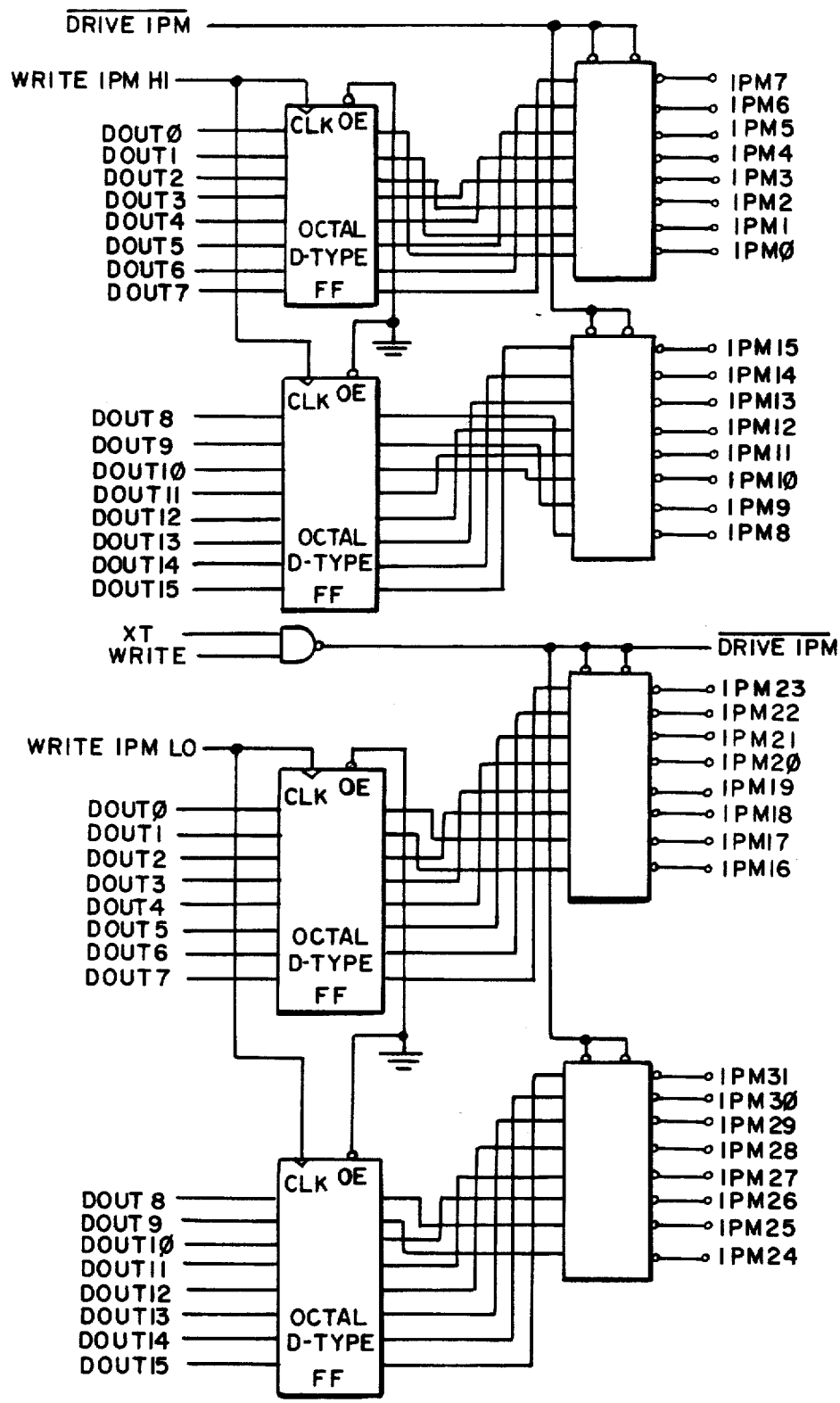
Figure 9:
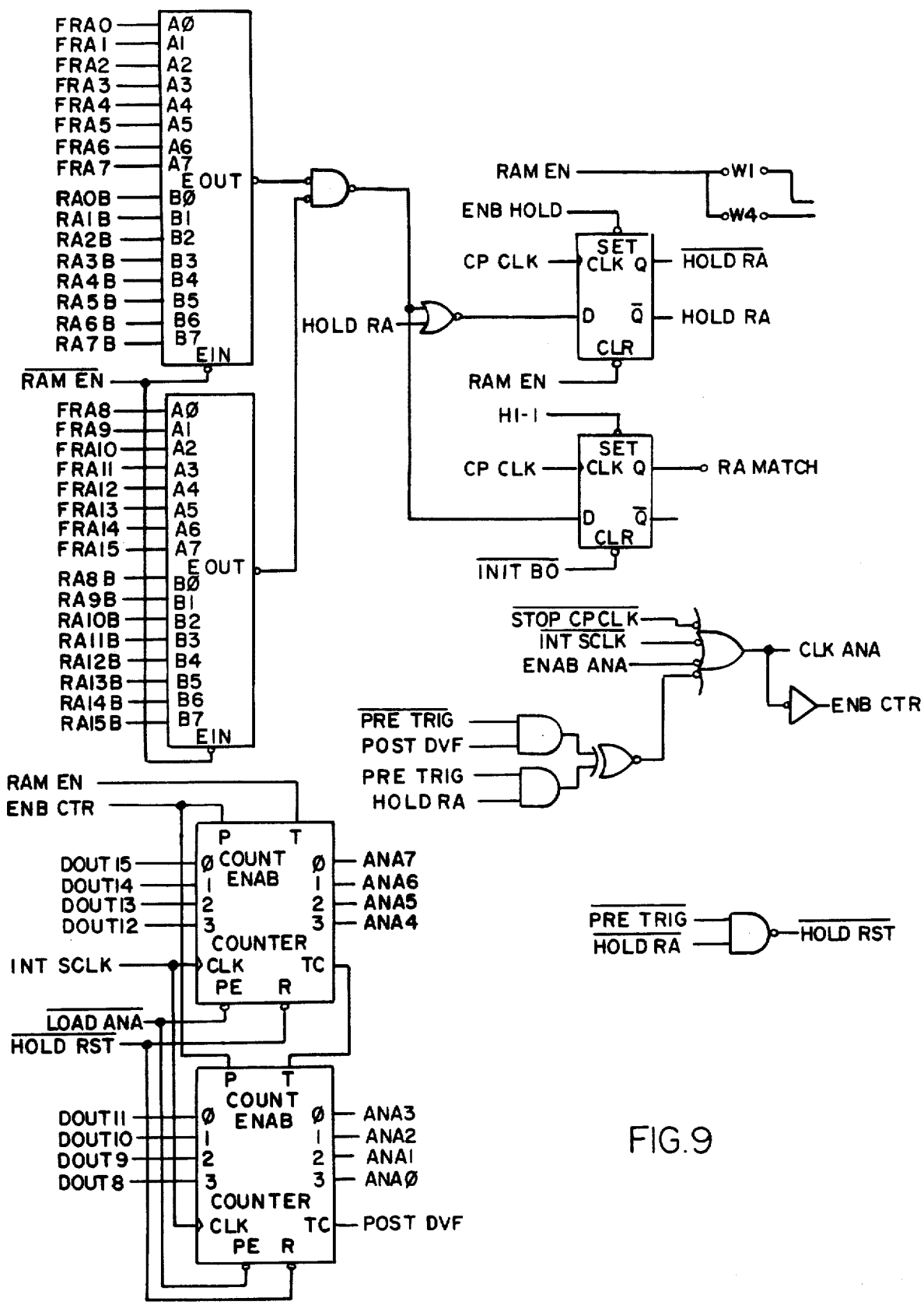
FIGS. 9 and 9A depict a more detailed logic diagram of interface logic used in the system control processor 11 to interface the microcontrol store via bus 20.
Figure 9A:
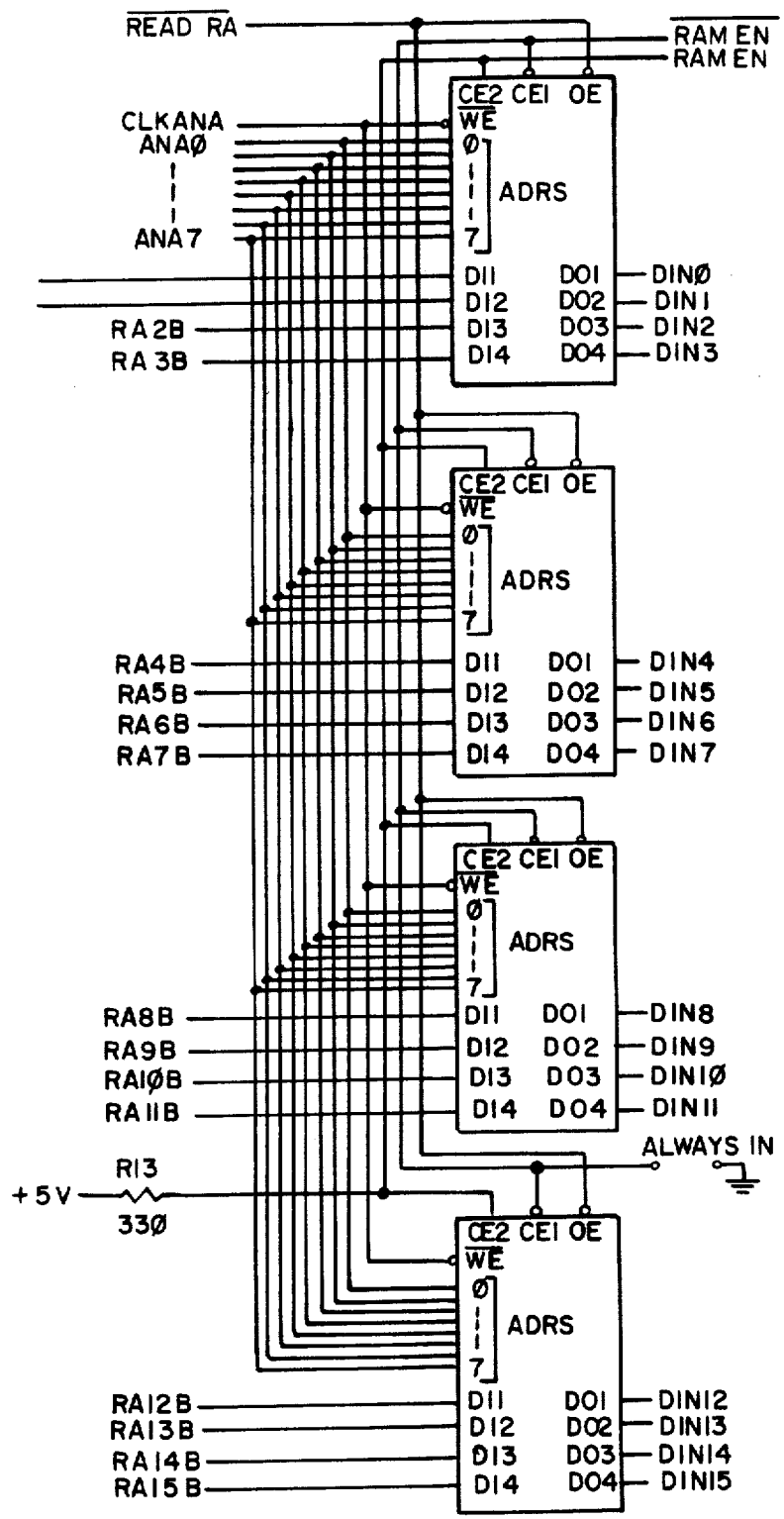
Figure 9A:
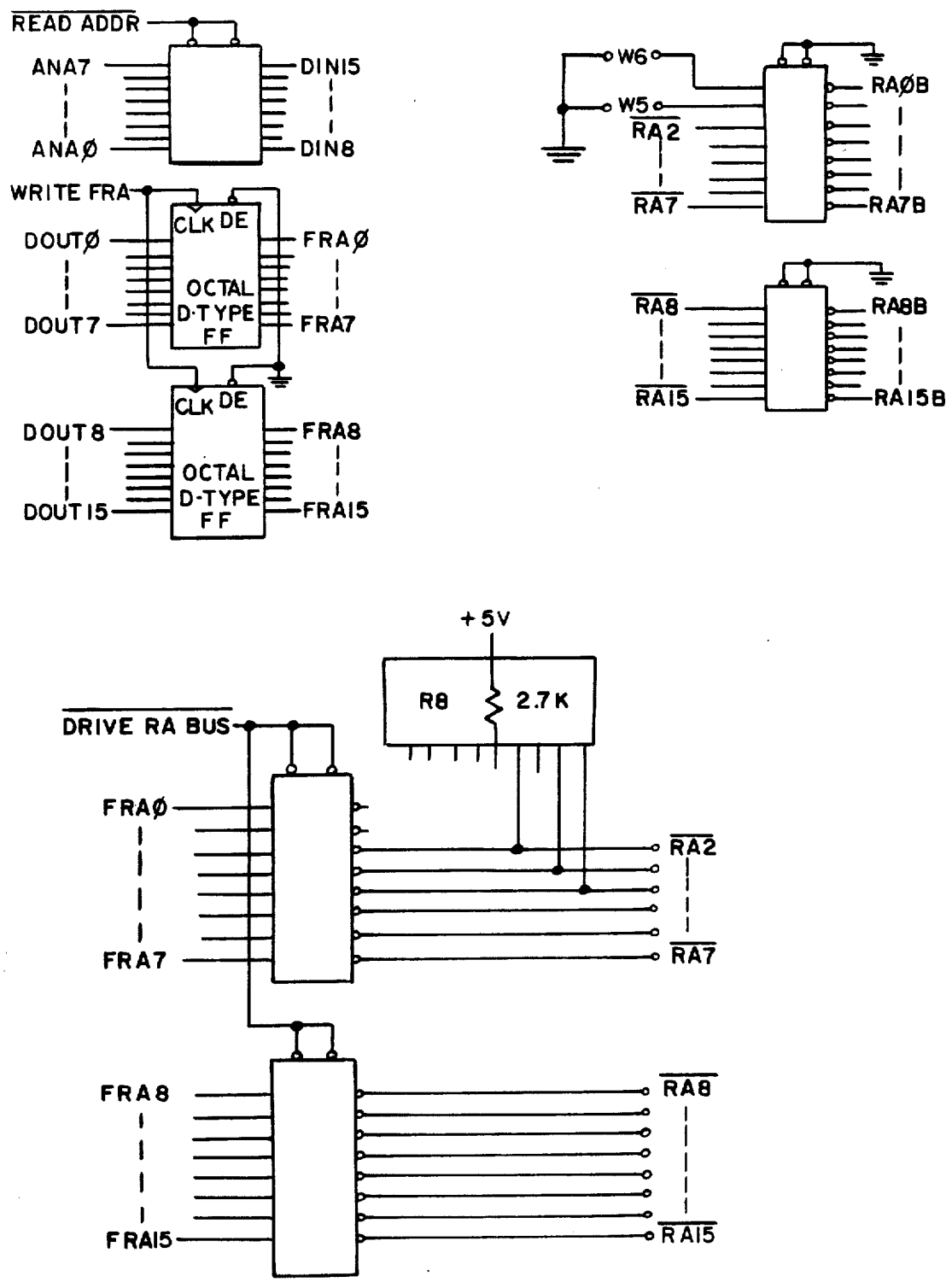
Figure 10:
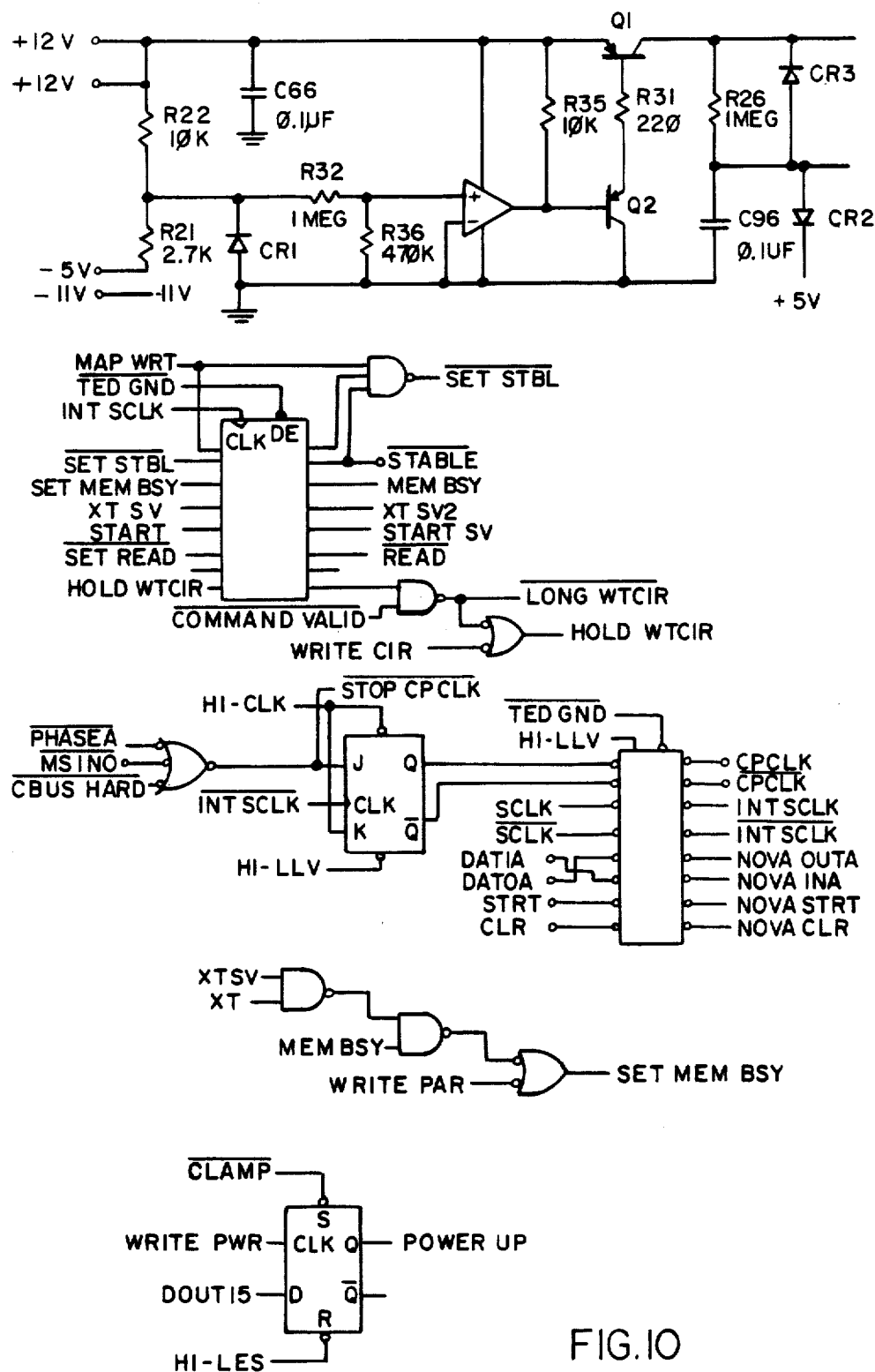
FIGS. 10 and 10A depict a more detailed logic diagram of the power-up logic used to start operation of the system control processor of FIG. 1.
Figure 10A:
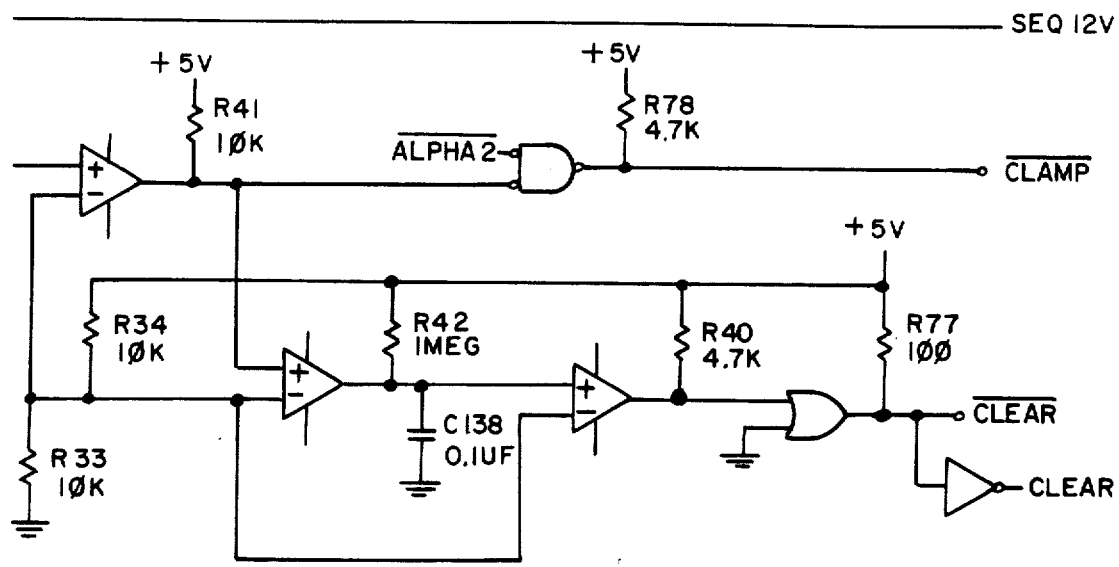
Figure 10A:
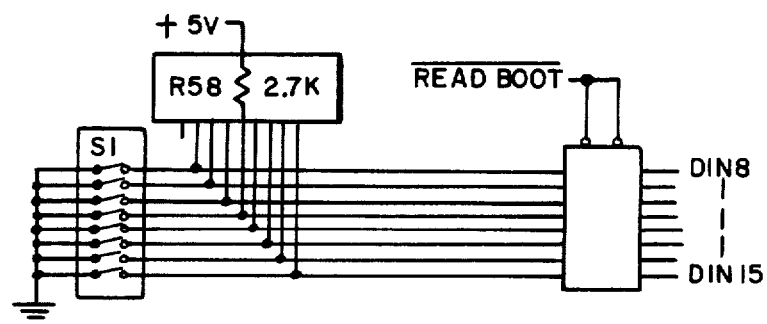

Accordingly, the system's normal processor uses the MBOOT program to then load whatever operating system software is required from an appropriate I/O device location via normally available I/O controller interface unit 15 into the main memory system 14. Once the operating system software has been so loaded, the MBOOT program terminates so that the user can make whatever applications use of the overall system is desired. Since the MV/8000 system is already known to and has been available for use by those in the art (as disclosed, for example, in the aforesaid documents) detailed logic diagrams of the normally available components in such system are not necessary. Exemplary logic diagrams therefore have been shown, for example, in the aforesaid Rasala et al U.S. patent application. With reference to the additional components discussed with reference to the invention, detailed logic for the system control processor 11, the EPROM 17, the PROM 18 and the RAM 19 are depicted in FIGS. 2–9. Thus, with reference to the system control processor 11, the central processor unit and support logic therefore is shown in FIG. 2. internal control logic and bus interconnections are shown in FIG. 6, timing and clock generation is shown in FIG. 7, and power-up logic is shown in FIG. 10. Interface logic for interfacing bus 20 is shown in FIG. 9 and interface logic for interfacing bus 21 is shown in FIG. 8. The RAM unit is shown in FIG. 3, the EPROM unit in FIG. 4 and the PROM unit in FIG. 5.

An exemplary sub-routine from the MBOOT program for loading the control store from main memory ("LCSLD") is included herein in microfiche form as an appendix hereto, such microfiche being incorporated by reference under the provisions of 37 CFR 1.96. Such microfiche is identified under the title "MBOOT PROGRAM LCSLD Sub-routine". Moreover, an exemplary LOAD CONTROL STORE program (LCS) together with suitable subroutines utilized therein is similarly included herein in microfiche form as a further appendix hereto and incorporated by reference under the provisions of 37 CFR 1.96. Such microfiche is identified under the title "LCS PROGRAM and Sub-Routines Used therein".

What is claimed is:

1. A method for starting up a data processing system which includes a main processor, a main memory, a microcode control store, auxiliary memory means and an input/output interface unit permitting communication between said data processing system and one or more input/output devices, said method comprising the steps of:
 (a) initially storing a basic instruction set in said auxiliary memory means;
 (b) automatically transferring said basic instruction set from said auxiliary memory means to said microcode control store when said data processing system is initially turned on;
 (c) initially storing an initialization program in said auziliary memory means;
 (d) transferring said intialization program from said auxiliary memory means to said main memory;
 (e) executing said initialization program on said main processor, using said basic instruction set, said execution including:
  (1) identifying a selected input/output device connected in said main processor in which a microcode load program and a desired microcode file are stored; and
  (2) transferring said microcode load program into the main memory from said input/output device using said main processor;
 (f) executing said microcode load program under control of said main processor, using said basic instruction set, said execution including the transferring of said desired microcode file from said selected input/output device to said microcode control store via said main memory.

2. A method according to claim 1 and further including the steps of:
 storing of an initial diagnostic program into said control store together with said basic instruction set; and
 executing said initial diagnostic program using said main processor to test the operation of said main processor.

3. A method according to claim 1 wherein the transferring of said basic instruction set is performed under control of said auxiliary processor means.

4. A method according to claim 2 wherein said auxiliary memory means initially stores said initial diagnostic program and including the step of automatically transferring said initial diagnostic program from said auxiliary memory means to said control store for storage therein when said data processing system is initially turned on.

5. A method according to claim 1 wherein the transferring said initialization program from said auxiliary memory means to said main memory is performed under control of said auxiliary processor means.

6. A method according to claim 5 and further wherein the execution of said initialization program is performed under control of said main processor means using said basic instruciton set and further includes the step of re-setting the input/output interface unit to place it in condition for communication with one or more input/output devices.

7. A method according to claim 6 wherein the execution of said initialization program by said main processor means further includes searching said identified selected input/output device for said microcode load program to locate said program therein and transferring said microcode file thereof to said main memory by said main procssor means.

8. A method according to claim 7 wherein the execution of said microcode load program is performed by said main processor and includes searching said identified selected input/output device to locate the desired microcode file therein to permit transfer therefrom to the main memory.

9. A method according to claim 8 wherein said auxiliary processor transfers said microcode file from said main memory to said control store on request of said main processor.

10. A method according to claim 9 wherein the transfer of said microcode file to said main memory by said main processor and the the transfer of said microcode file from said main memory to said control store sequentially transferring, by using said main processor, limited portions of said microcode file from said selected input/output device to said main memory; and sequentially transferring, by using said auxiliary processor on request of said main processor, said limited portions of said microcode file from said main memory to said control store.

11. A method according to claim 10 wherein each said limited portion of said microcode file is transferred from said input/output device to said main memory and from said main memory to said control store before a next successive limited portion thereof is so transferred.

12. A method according to claim 1 and further including the step of storing an inhibit instruction into said control store together with said basic instruction set to prevent the loading of microcode instructions other than those which can be compatibly used by said data processing system.

13. A method according to claim 1 wherein the executing of said microcode load program further includes the step of loading operating system software after said selected microcode file has been loaded into said control store.

* * * * *